(12) United States Patent
Ochi et al.

(10) Patent No.: US 10,296,197 B2
(45) Date of Patent: May 21, 2019

(54) INFORMATION PROCESSING APPARATUS, INFORMATION PROCESSING METHOD, AND PROGRAM

(71) Applicant: SONY MOBILE COMMUNICATIONS INC., Tokyo (JP)

(72) Inventors: Takayuki Ochi, Tokyo (JP); Mizuho Oda, Tokyo (JP); Miyuki Shirakawa, Tokyo (JP); Ryo Nakagawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 77 days.

(21) Appl. No.: 15/429,294

(22) Filed: Feb. 10, 2017

(65) Prior Publication Data

US 2017/0242561 A1 Aug. 24, 2017

(30) Foreign Application Priority Data

Feb. 19, 2016 (JP) ................................ 2016-030244

(51) Int. Cl.
*G06F 3/0485* (2013.01)
*G06F 3/0481* (2013.01)
*G06F 3/0484* (2013.01)
*G06F 16/438* (2019.01)

(52) U.S. Cl.
CPC .......... *G06F 3/0485* (2013.01); *G06F 3/0481* (2013.01); *G06F 3/04842* (2013.01); *G06F 16/4393* (2019.01)

(58) Field of Classification Search
CPC ............... G06F 17/3028; G06F 3/0481; G06F 17/30029

See application file for complete search history.

(56) References Cited

U.S. PATENT DOCUMENTS

| | | | | |
|---|---|---|---|---|
| 8,484,682 | B2 * | 7/2013 | Inagaki | H04N 5/44591 725/44 |
| 8,922,575 | B2 * | 12/2014 | Garside | G06T 15/005 345/557 |
| 2004/0161224 | A1 * | 8/2004 | Yamazoe | G06F 17/3028 386/252 |
| 2008/0310725 | A1 | 12/2008 | Kurata et al. | |
| 2010/0162172 | A1 * | 6/2010 | Aroner | G06F 17/30029 715/838 |
| 2015/0042823 | A1 * | 2/2015 | Relf | H04L 51/10 348/207.1 |
| 2016/0358628 | A1 * | 12/2016 | Liu | G11B 27/031 |
| 2016/0378269 | A1 * | 12/2016 | Conway | G06F 3/0481 715/719 |

FOREIGN PATENT DOCUMENTS

JP 2008-312061 12/2008

* cited by examiner

*Primary Examiner* — Haoshian Shih
(74) *Attorney, Agent, or Firm* — Xsensus LLP

(57) ABSTRACT

Provided is an information processing apparatus including: a decision unit configured to decide a form of each of a plurality of display objects based on a plurality of contents, on the basis of viewing priority information which has an influence on viewing priority of the content corresponding to the display object; and an output control unit configured to cause an output unit to output each of the plurality of display objects in the form decided by the decision unit.

21 Claims, 14 Drawing Sheets

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2016-030244 filed Feb. 19, 2016, the entire contents of which are incorporated herein by reference.

BACKGROUND

The present disclosure relates to information processing apparatuses, information processing methods, and programs.

The progress of imaging technologies has in recent years been accompanied by technologies for browsing an image obtained by imaging (hereinafter also referred to as a "captured image"). Among such technologies are browsing applications, such as an image viewer and the like. The users of imaging apparatuses typically view their own captured images using the browsing application.

At present, digital imaging apparatuses, such as a digital still camera, digital camcorder, and the like, have been widespread, and the users can easily capture images. Meanwhile, the ease of capturing images leads to a large number of captured images. Therefore, sometimes a part of captured images is not browsed after all effort.

A technique of extracting a portion of a captured image has been proposed. For example, JP 2008-312061A discloses an image processing apparatus which calculates a digest score for a plurality of moving images for each predetermined imaging interval, selects a moving image having a highest calculated digest score for each predetermined imaging interval, and generates a digest image using the selected moving images.

SUMMARY

However, in the technology disclosed in JP 2008-312061A, it is likely that a portion of a plurality of contents cannot be viewed by the user. For example, it is difficult for the user to view any of the moving images that has not been selected for any of the imaging intervals. It is also likely that the user forgets the presence of such a moving image itself.

With the above in mind, in the present disclosure, proposed is an arrangement which can allow the user to grasp a plurality of contents while reducing the user's burden of viewing the contents.

According to an embodiment of the present disclosure, there is provided an information processing apparatus including: a decision unit configured to decide a form of each of a plurality of display objects based on a plurality of contents, on the basis of viewing priority information which has an influence on viewing priority of the content corresponding to the display object; and an output control unit configured to cause an output unit to output each of the plurality of display objects in the form decided by the decision unit.

In addition, according to an embodiment of the present disclosure, there is provided an information processing method to be performed by a processor, the information processing method including: deciding a form of each of a plurality of display objects based on a plurality of contents, on the basis of viewing priority information which has an influence on viewing priority of the content corresponding to the display object; and causing an output unit to output each of the plurality of display objects in the decided form.

In addition, according to an embodiment of the present disclosure, there is provided a program for causing a computer to execute: a decision function of deciding a form of each of a plurality of display objects based on a plurality of contents, on the basis of viewing priority information which has an influence on viewing priority of the content corresponding to the display object, and an output control function of causing an output unit to output each of the plurality of display objects in the form decided by the decision function.

As described above, according to the embodiments the present disclosure, provided is an arrangement which can allow the user to grasp a plurality of contents while reducing the user's burden of viewing the contents. Note that the effects described above are not necessarily limitative. With or in the place of the above effects, there may be achieved any one of the effects described in this specification or other effects that may be grasped from this specification.

DETAILED DESCRIPTION OF THE EMBODIMENT(S)

Figure 1:
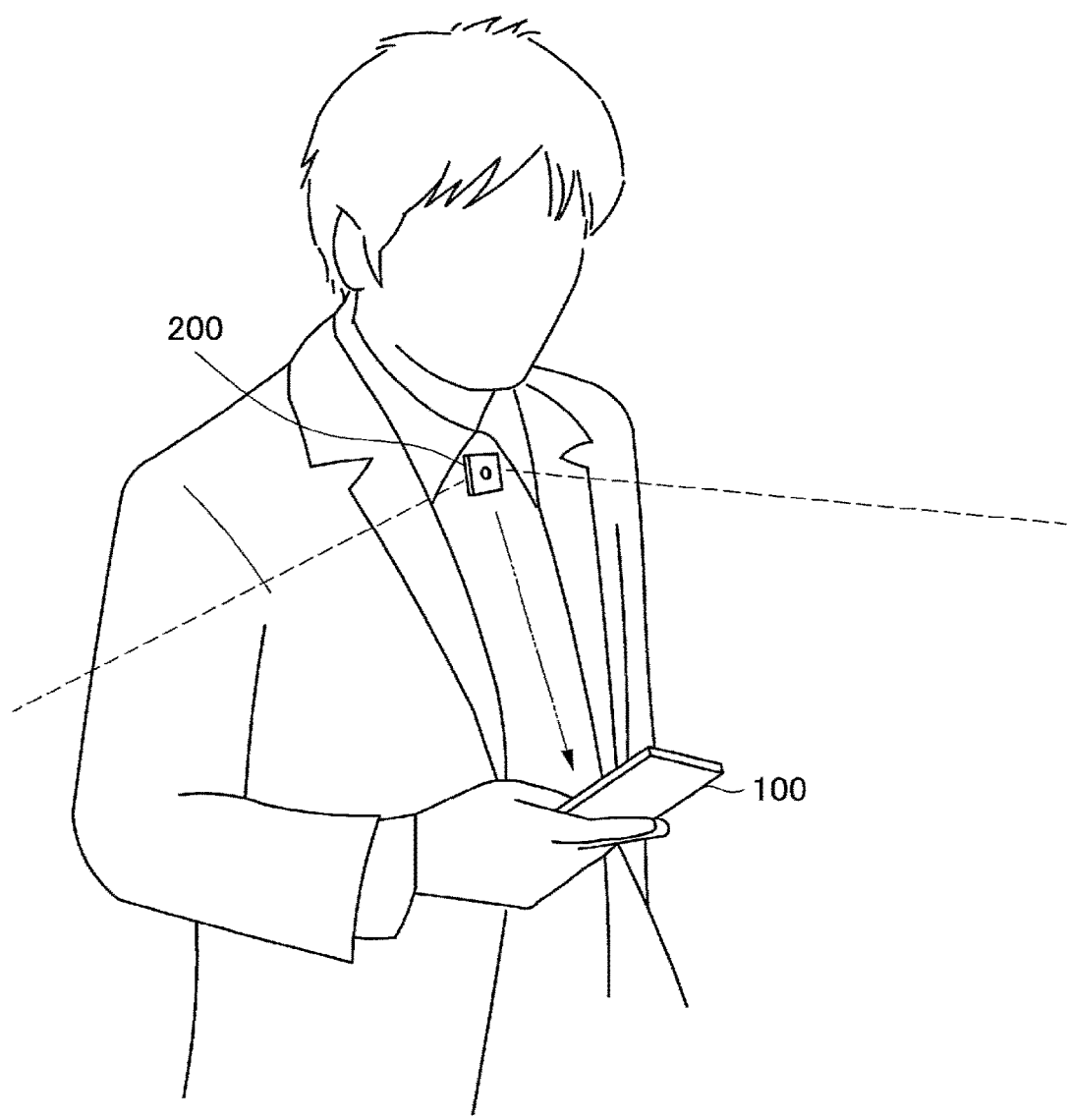
FIG. 1 is a diagram for describing an overview of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Embodiment of the present disclosure
1-1. Overview of system
1-2. Functional configuration of apparatus
1-3. Process by apparatus
1-4 Summary of embodiment of the present disclosure
1-5. Variations
2. Hardware configuration of information processing apparatus according to embodiment of the present disclosure
3. Conclusion

1. EMBODIMENT OF THE PRESENT DISCLOSURE

An embodiment of the present disclosure will be described. In the embodiment of the present disclosure, an information processing apparatus 100 according to the embodiment of the present disclosure processes contents which are provided from an external apparatus.

1-1. Overview of System

Firstly, an overview of the information processing system according to the embodiment of the present disclosure will be described with reference to FIG. 1. FIG. 1 is a diagram for describing the overview of the information processing system according to the embodiment of the present disclosure.

The information processing system according to the embodiment of the present disclosure includes the information processing apparatus 100 and a content generation apparatus 200. The information processing apparatus 100 has a content playback function and a communication function. The content generation apparatus 200 has a content generation function and a communication function. Specifically, the information processing apparatus 100 acquires a content through communication, and plays back the acquired content. The content generation apparatus 200 generates and transmits a content at a predetermined timing. Therefore, in the information processing system, the information processing apparatus 100 can play back a content generated by the content generation apparatus 200.

For example, the information processing system according to the embodiment of the present disclosure includes a smartphone 100 and a camera 200p, as shown in FIG. 1. The camera 200 captures an image of the surrounding area, and transmits the captured image to the smartphone 100. The smartphone 100 displays the captured image thus received.

Here, the amount of contents such as captured images and the like may be huge. For example, when the camera 200 shown in FIG. 1 automatically captures an image at predetermined time intervals, captured images are generated and accumulated one after another in the information processing apparatus 100. Therefore, to find a content useful for the user themselves from the huge amount of accumulated contents is a burden on the user.

Under these circumstances, it may be conceived that only a portion of the accumulated contents is retrieved and presented to the user. However, it is difficult for the user to view contents which have not been presented. Furthermore, the user may forget the presence of contents which have not been presented. Contents which have not been presented to the user may be useful for the user.

With the above in mind, in the embodiment of the present disclosure, proposed is the information processing apparatus 100 which can allow the user to grasp all contents while reducing the user's burden of viewing the contents. The information processing apparatus 100 will now be described in greater detail. Note that, in FIG. 1, the information processing apparatus 100 is a smartphone by way of example. Alternatively, the information processing apparatus 100 may be a tablet terminal, game device, wearable terminal, personal computer, or the like. The content generation apparatus 200 is a camera by way of example. The content generation apparatus 200 may collect a sound in addition to capturing an image. The content generation apparatus 200 may transmit audio information obtained by collecting a sound to the information processing apparatus 100.

1-2. Functional Configuration of Apparatus

Figure 2:
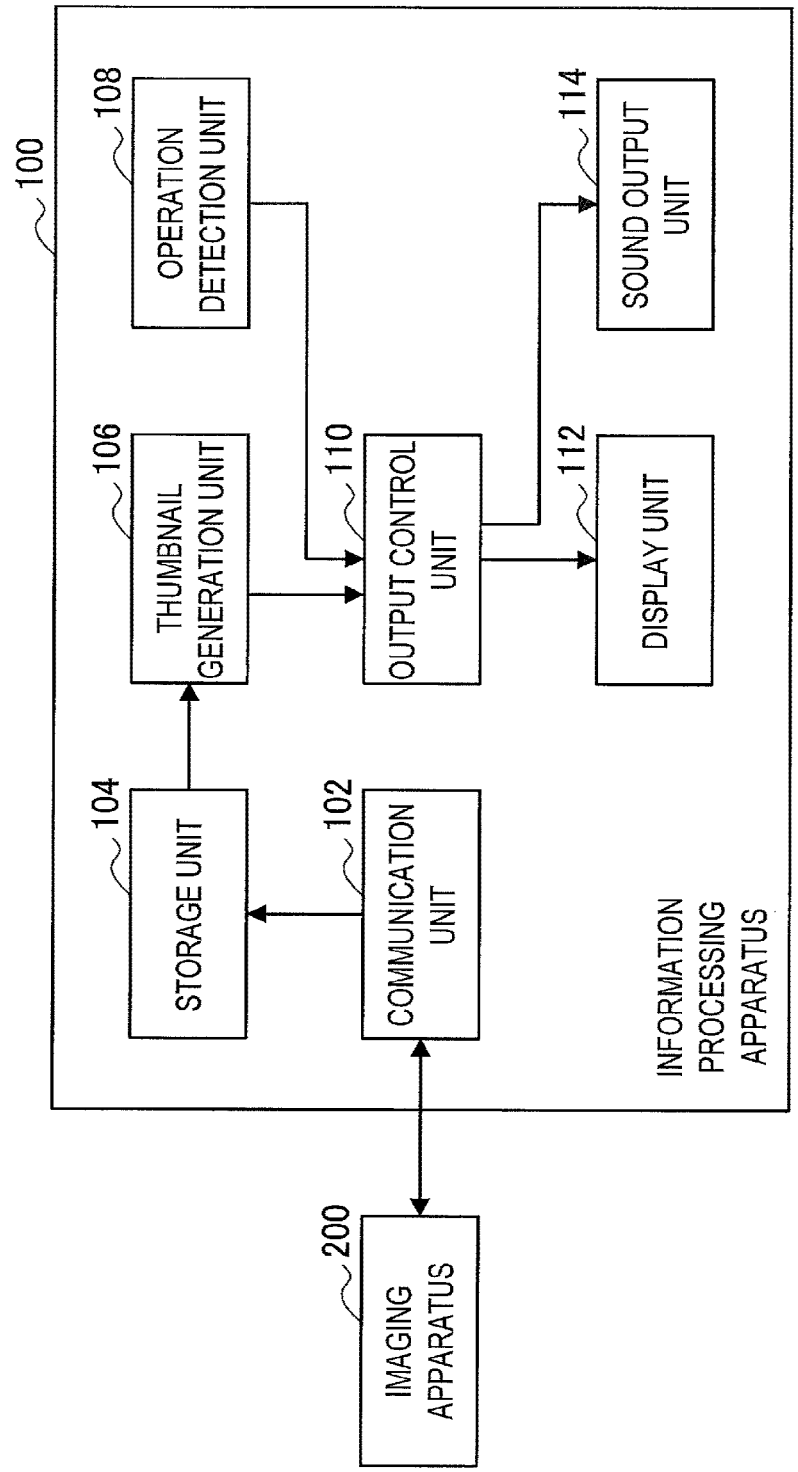
FIG. 2 is a block diagram schematically showing a functional configuration example of an information processing apparatus according to an embodiment of the present disclosure.

Next, a functional configuration of the information processing apparatus 100 according to the embodiment of the present disclosure will be described with reference to FIG. 2. FIG. 2 is a block diagram schematically showing a functional configuration example of the information processing apparatus 100 according to the embodiment of the present disclosure.

As shown in FIG. 2, the information processing apparatus 100 includes a communication unit 102, a storage unit 104, a thumbnail generation unit 106, an operation detection unit 108, an output control unit 110, a display unit 112, and a sound output unit 114.

(Communication Unit)

The communication unit 102 communicates with the content generation apparatus 200. Specifically, the communication unit 102 receives a content from the content generation apparatus 200. For example, the communication unit 102 employs a wireless communication scheme for communication with the content generation apparatus 200. Note that the communication unit 102 may alternatively employ a wired communication scheme for communication with the content generation apparatus 200.

(Storage Unit)

The storage unit 104 stores a content. Specifically, the storage unit 104 stores a content received from the communication unit 102. For example, a content may be a still image or moving image which is captured, or a sound which is collected.

(Thumbnail Generation Unit)

Figure 3:
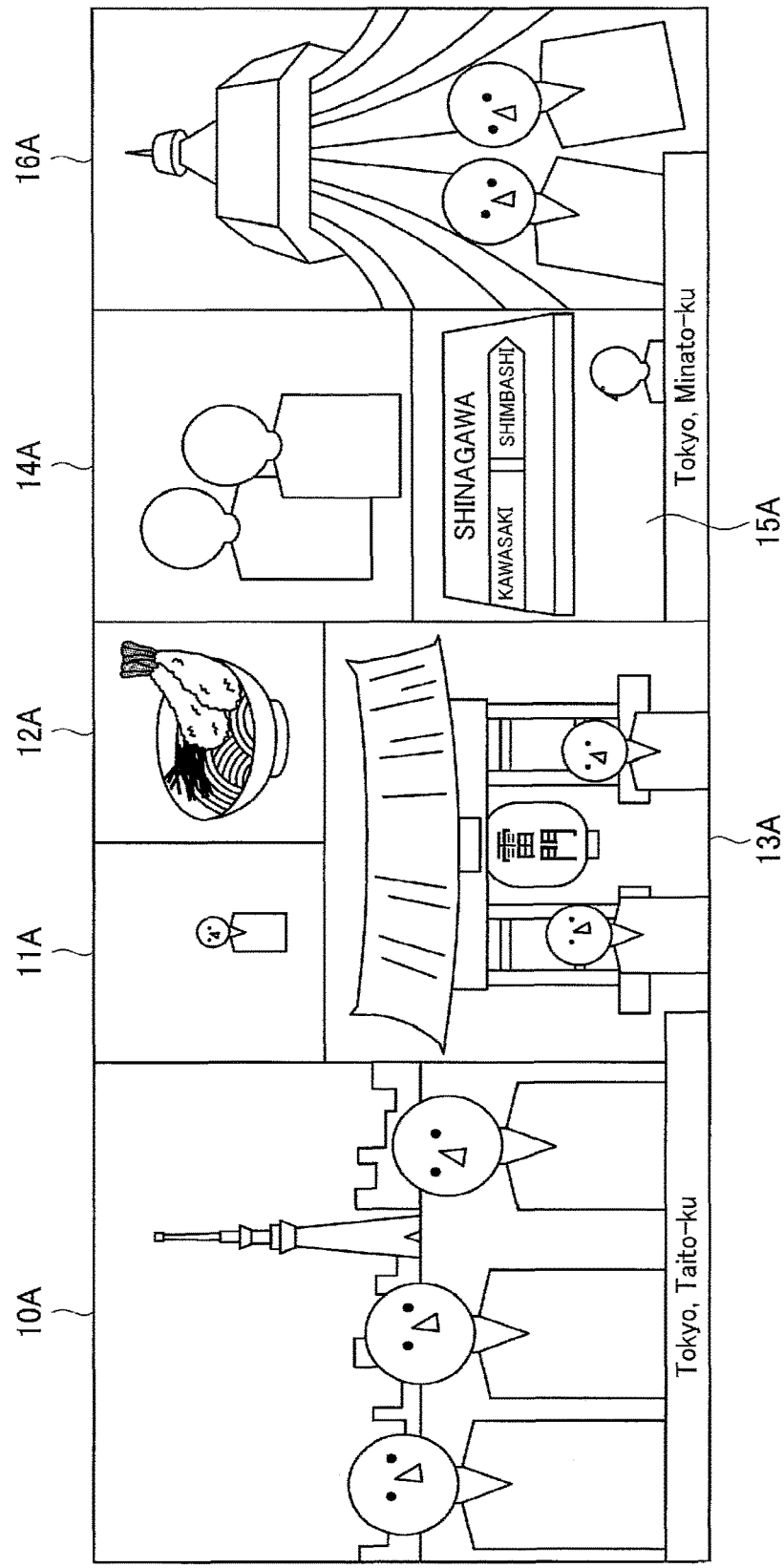
FIG. 3 is a diagram showing an example in which thumbnails having different sizes are displayed by an information processing apparatus according to an embodiment of the present disclosure.

The thumbnail generation unit 106 generates a thumbnail which is an example of a display object on the basis of a content. Specifically, the thumbnail generation unit 106, which serves as a decision unit, decides a form of the thumbnail on the basis of information which has an influence on the priority of viewing a content corresponding to the thumbnail (hereinafter also referred to as "viewing priority information"), and generates the thumbnail which has the decided form. For example, if a condition for generation of a thumbnail is satisfied, the thumbnail generation unit 106 acquires information about generation of a content (hereinafter also referred to as "content generation information") from meta-information about the content or the like, and decides the form of the thumbnail on the basis of the content generation information. Furthermore, an example of a thumbnail thus generated will be described with reference to FIG. 3. FIG. 3 is a diagram showing an example in which thumbnails having different sizes are displayed by the information processing apparatus 100 according to the embodiment of the present disclosure.

Initially, the thumbnail generation unit 106 determines whether or not the thumbnail generation condition is satisfied. For example, the thumbnail generation unit 106 determines whether or not a change in date or location, or the end of an event, such as a travel or the like, has occurred.

If it is determined that the thumbnail generation condition is satisfied, the thumbnail generation unit 106 decides the form of a thumbnail. Specifically, the thumbnail generation unit 106 decides the size of a thumbnail on the basis of information which varies depending on an entity which has issued an instruction to generate a content. More specifically, the thumbnail generation unit 106 decides the size of a thumbnail on the basis of information which indicates a content generation mode. The content generation mode includes a mode in which a content is generated according to the user's operation of instructing to generate a content (hereinafter also referred to as a "manual generation mode"), and a mode in which a content is generated without depending on the user's operation if a predetermined condition is satisfied (hereinafter also referred to as an "automatic generation mode"). For example, the size of a thumbnail which is generated by the thumbnail generation unit 106 on the basis of a content which is generated when the content generation mode is the manual generation mode (e.g., a thumbnail 10A shown in FIG. 3) is larger than the size of a thumbnail which is generated by the thumbnail generation unit 106 on the basis of a content which is generated when the content generation mode is the automatic generation mode (e.g., a thumbnail 11A shown in FIG. 3).

Thereafter, the thumbnail generation unit 106 generates a thumbnail having the decided form. Specifically, the thumbnail generation unit 106 generates a thumbnail having the decided size on the basis of a content. For example, when the content is a still image, the thumbnail generation unit 106 processes the still image into the decided form. When the content is a moving image, the thumbnail generation unit 106 extracts, from the moving image, a portion of a plurality of images constituting the moving image, and processes an extended version of still image in which the extracted images are sequentially displayed, into the decided form.

Note that the content generation information may be about the type of a device which has generated a content. Specifically, the thumbnail generation unit 106 decides the size of a thumbnail corresponding to a content according to the type of an apparatus which has generated the content. For example, the size of a thumbnail generated by the thumbnail generation unit 106 on the basis of a content generated by a smartphone is larger than the size of a thumbnail generated by the thumbnail generation unit 106 on the basis of a content generated by an automatic imaging camera. Note that the size of a thumbnail may be previously set according to the device type.

Figure 4:
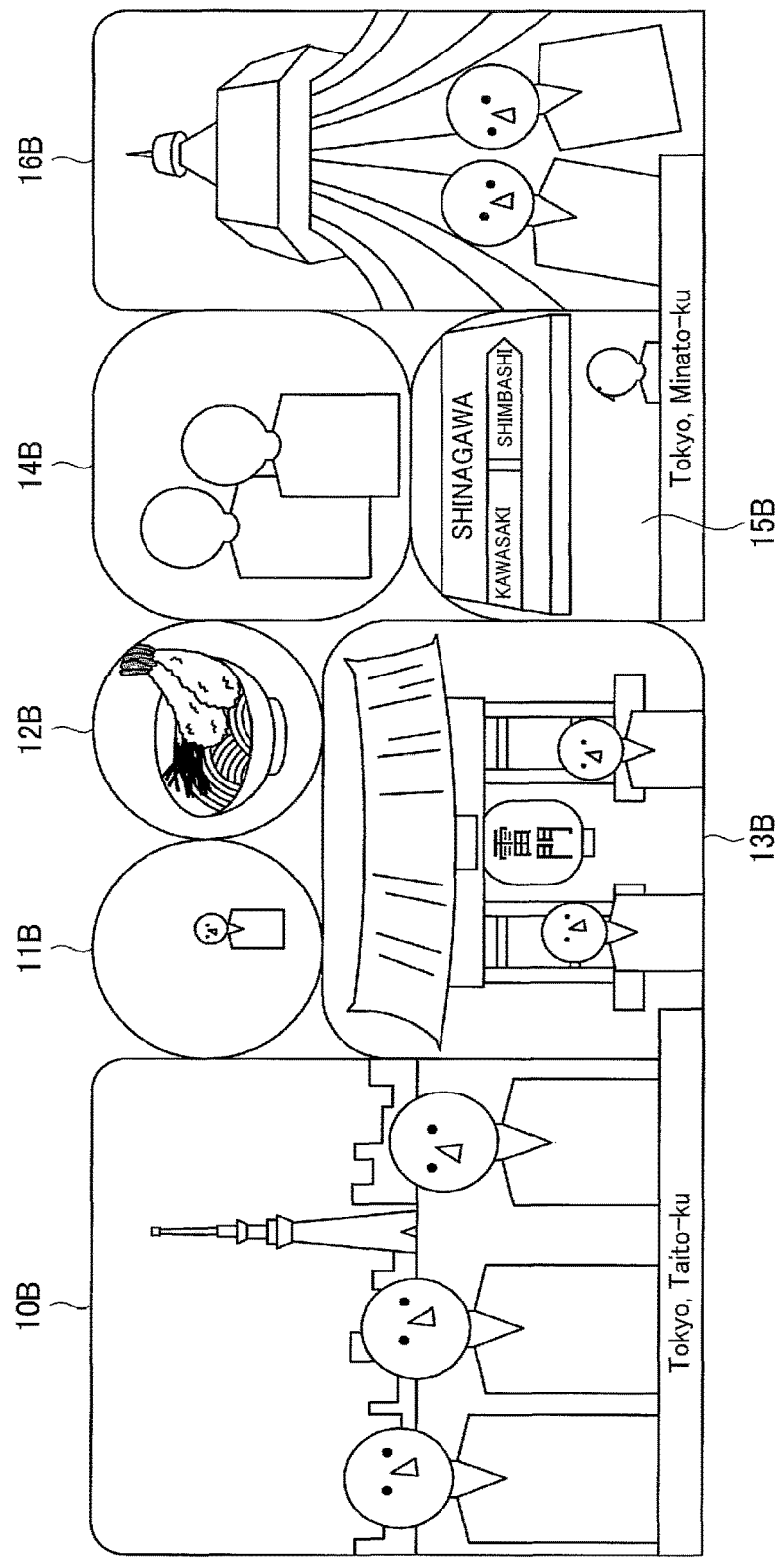
FIG. 4 is a diagram showing an example in which thumbnails having different shapes are displayed by an information processing apparatus according to an embodiment of the present disclosure.

Alternatively, the thumbnail generation unit 106 may decide a shape of a thumbnail on the basis of the viewing priority information. An example in which the shape of a thumbnail is decided on the basis of the viewing priority information will be described with reference to FIG. 4. FIG. 4 is a diagram showing an example in which thumbnails having different shapes are displayed by the information processing apparatus 100 according to the embodiment of the present disclosure.

Specifically, the thumbnail generation unit 106 decides the roundness of a corner of a thumbnail on the basis of the content generation information. For example, a corner of a thumbnail generated by the thumbnail generation unit 106 on the basis of a content when the content generation mode is the manual generation mode (e.g., a thumbnail 10B shown in FIG. 4) is more round than a corner of a thumbnail generated by the thumbnail generation unit 106 on the basis of a content when the content generation mode is the automatic generation mode (e.g., a thumbnail 11B shown in FIG. 4).

Figure 5:
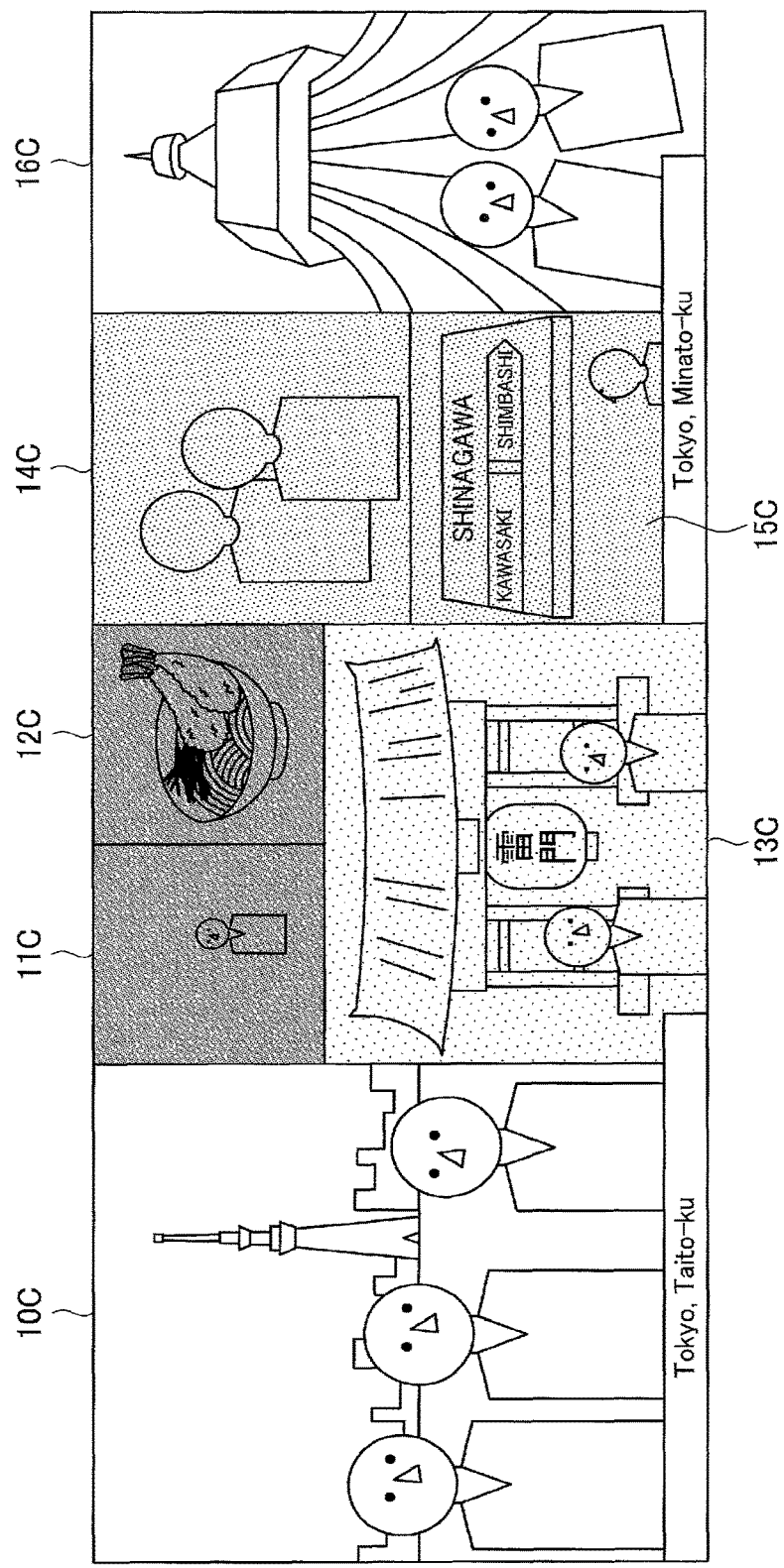
FIG. 5 is a diagram showing an example in which thumbnails having different brightnesses are displayed by an information processing apparatus according to an embodiment of the present disclosure.

Alternatively, the thumbnail generation unit 106 may decide a brightness of a thumbnail according to the viewing priority information. An example in which the brightness of a thumbnail is decided according to the viewing priority information will be described with reference to FIG. 5. FIG. 5 is a diagram showing an example in which thumbnails having different brightnesses are displayed by the information processing apparatus 100 according to the embodiment of the present disclosure.

Specifically, the thumbnail generation unit 106 decides the luminance of a thumbnail according to the content generation information. For example, the luminance of a thumbnail generated by the thumbnail generation unit 106 on the basis of a content when the content generation mode is the manual generation mode (e.g., a thumbnail 10C shown in FIG. 5) is higher than the luminance of a thumbnail generated by the thumbnail generation unit 106 on the basis of a content when the content generation mode is the automatic generation mode (e.g., a thumbnail 11C shown in FIG. 5). Note that the brightness of a thumbnail may be represented by the lightness or colorfulness of the thumbnail, or by other visual effects related to brightness. Note that the brightness of a thumbnail may be changed back to the original state after the thumbnail is selected by the user's operation.

Although FIG. 4 or FIG. 5 shows a combination of the size and shape or brightness of a thumbnail as the form of the thumbnail, the shape or brightness of a thumbnail may be singly decided as the form of the thumbnail. Alternatively, of course, control of three or more forms may be combined.

(Operation Detection Unit)

The operation detection unit 108 detects an operation which is performed on the information processing apparatus 100. Specifically, the operation detection unit 108 acquires information input to the information processing apparatus 100 (hereinafter also referred to as "input information"), and detects an input operation on the basis of the acquired input information. For example, when a touch operation is performed on the information processing apparatus 100, the operation detection unit 108 detects, from the input information, a detail of the operation such as a touch position or the like.

(Output Control Unit)

The output control unit 110 controls an output of the information processing apparatus 100. Specifically, the output control unit 110 controls processes performed by the display unit 112 and the sound output unit 114.

Initially, the control of a process performed by the display unit 112 will be described. The output control unit 110 causes the display unit 112 to display a thumbnail which is an example of a display object. Specifically, the output control unit 110 causes the display unit 112 to output a plurality of thumbnails in respective forms which are decided on the basis of the viewing priority information. More specifically, the output control unit 110 decides a display form for each of all thumbnails generated by the thumbnail generation unit 106. For example, the output control unit 110 decides where to display the thumbnails, in what order to display the thumbnails, whether or not to scroll the thumbnails, and at what speed to scroll the thumbnails, on the basis of attribute information of contents corresponding to the thumbnails. Specifically, the output control unit 110 decides the order in which the thumbnails are to be displayed, according to the chronological order in which contents corresponding to the thumbnails have been generated. As shown in FIG. 3, at least a portion of the screen is divided into grid cells depending on the sizes of thumbnails. A thumbnail is output in each grid cell. Note that the information about the thumbnail display form may be stored as schedule information.

The output control unit 110 also causes the display unit 112 to display location information along with a thumbnail. Specifically, the output control unit 110 causes the display unit 112 to display location information of a content corresponding to a thumbnail (hereinafter also referred to as "thumbnail location information") in association with the thumbnail. More specifically, if a difference in location information of contents corresponding to adjacent thumbnails is a predetermined range or more, the output control unit 110 causes the display unit 112 to display the location information of a content corresponding to a thumbnail which is output later. The process of displaying location information will be described in greater detail with reference to FIG. 3.

Initially, the output control unit 110 determines whether or not a difference in location information between adjacent thumbnails is within a predetermined range. More specifically, the output control unit 110 determines whether or not a distance between locations indicated by the location information of adjacent thumbnails is a predetermined length or more. For example, the output control unit 110 determines whether or not a distance between the location "Tokyo, Taito-ku" indicated by the location information of a thumbnail 13A shown in FIG. 3 and the location "Tokyo, Minato-ku" indicated by the location information of a thumbnail 15A adjacent to the thumbnail 13A is a predetermined length or more. Note that if location information indicates the name of a place, the output control unit 110 may determine whether or not thumbnails have different place names. The thumbnail generation unit 106 may determine whether or not to display location information.

If it is determined that a difference in location information between adjacent thumbnails is not within the predetermined range, the output control unit 110 causes the display unit 112 to display the location information of a content corresponding to one of the adjacent thumbnails which is output later, in association with the thumbnail which is output later. For example, if it is determined that a distance between a location indicated by the location information of the thumbnail 13A and a location indicated by the location information of the thumbnail 15A is a predetermined length or more, the output control unit 110 causes the display unit 112 to display an object indicating the location "Tokyo, Minato-ku" indicated by the location information of the thumbnail 15A, in text, in a lower portion of the thumbnail 15A.

Figure 6:
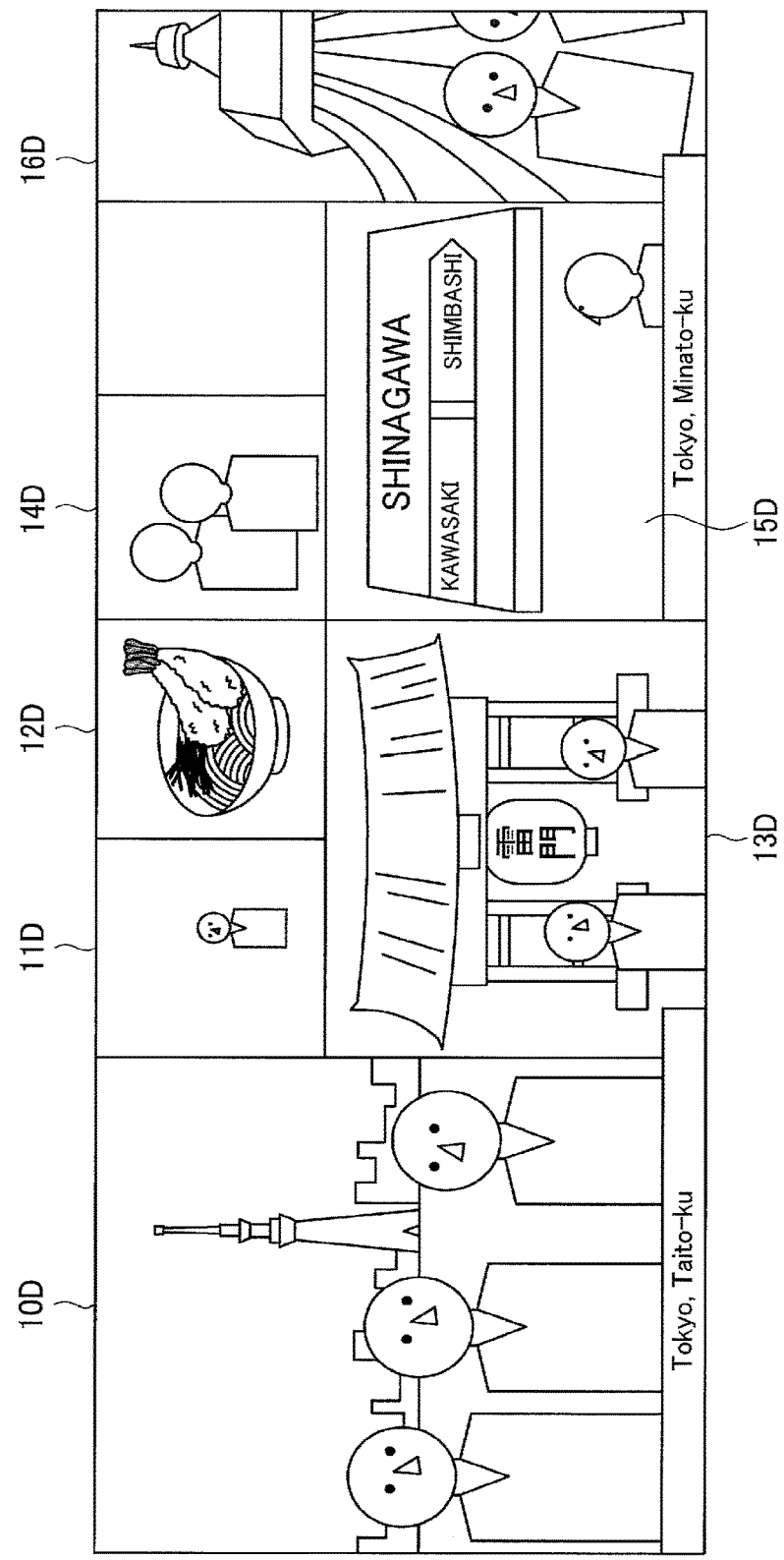
FIG. 6 is a diagram showing an example in which a form of a thumbnail is changed, depending on the display of location information, by an information processing apparatus according to an embodiment of the present disclosure.

Note that when the thumbnail location information is displayed, the output control unit 110 may change the form of a thumbnail which is output later to a form different from the decided form. Specifically, the output control unit 110 changes the form of the thumbnail which is output later to a form which is emphasized compared to the decided form. Furthermore, a change in thumbnail form depending on the display of the thumbnail location information will be described in greater detail with reference to FIG. 6. FIG. 6 is a diagram showing an example in which the form of a thumbnail is changed, depending on the display of location information, by the information processing apparatus 100 according to the embodiment of the present disclosure.

Initially, the output control unit 110 determines whether or not the location information of a thumbnail is to be displayed. For example, the output control unit 110 performs the above thumbnail location information displaying process on a thumbnail 15D shown in FIG. 6, to determine whether or not the location information of the thumbnail 15D is to be displayed.

If it is determined that the location information of a thumbnail is to be displayed, the output control unit 110 changes the form of the thumbnail to an emphasized form. For example, the output control unit 110 enlarges the size of the thumbnail 15D, the location information of which is displayed, as shown in FIG. 6. Note that the form of a thumbnail may be changed only temporarily. For example, the size of the thumbnail 15D may become large at a timing when the thumbnail 15D is output, and may return to the original size after a predetermined time has elapsed, or after the thumbnail 15D is moved by scrolling by a predetermined distance.

While the thumbnail the location information of which is displayed is in the changed form, the form of another thumbnail, particularly an adjacent thumbnail, may also be changed. For example, as shown in FIG. 6, while the thumbnail 15D temporarily has an enlarged size, the size of a thumbnail 14D adjacent to the thumbnail 15D may be reduced. Alternatively, as shown in FIG. 6, the output of a thumbnail 16D adjacent to the thumbnail 15D may be delayed. Note that while the form of a thumbnail is changed in such a manner, there may be a region on the screen where no thumbnail is output, or another thumbnail may be output in the region. When a content corresponding to such another thumbnail (e.g., the thumbnail 14D) is a moving image, that thumbnail may be one which is generated on the basis of an image other than the image displayed as the thumbnail 14D of the moving image. The output of such another thumbnail may be an early output of a thumbnail which is supposed to be output after the thumbnail 15D. Alternatively, while the form is changed, an adjacent thumbnail may be temporarily hidden.

Next, the control of a process performed by the sound output unit 114 will be described. The output control unit 110 causes the sound output unit 114 to output a sound. Specifically, the output control unit 110 causes the sound output unit 114 to output a sound related to a thumbnail at a timing when the thumbnail is displayed. For example, when a content corresponding to a thumbnail has audio information or is associated with audio information, the output control unit 110 causes the sound output unit 114 to output a sound according to the audio information at a timing when the thumbnail is displayed. The audio information may be recorded along with a video, such as a moving image or the like, and may be separated from a video. Note that, after the display form of a thumbnail has been decided, information such as the output timing of a sound or the like may be added to the above schedule information.

The output control unit 110 also causes the sound output unit 114 to output a background sound while a thumbnail is being played back. Specifically, the output control unit 110 causes the sound output unit 114 to output music such as background music (BGM) or the like, or a sound such as an ambient sound or the like, during playback of a thumbnail. Note that the background sound may be controlled according to a thumbnail which is being played back. For example, while the above sound associated with a thumbnail is being output, the volume of the background sound may be reduced, or the output of the background sound may be temporarily stopped.

Next, a function of controlling both of processes performed by the display unit 112 and the sound output unit 114 will be described. The output control unit 110 controls playback of a thumbnail according to an operation of playing back the thumbnail. Specifically, when the operation detection unit 108 detects an operation of starting playback of a thumbnail, the output control unit 110 causes each output unit to start playing back a thumbnail. For example, the process of playing back a thumbnail according to the embodiment of the present disclosure may be provided as an application such as a viewer. When a thumbnail playback viewer is activated, the output control unit 110 causes the display unit 112 to start displaying a generated thumbnail. Similarly, the output control unit 110 causes the sound output unit 114 to start outputting a sound.

The output control unit 110 also plays back a content corresponding to a thumbnail to be output, according to an operation performed on the thumbnail. Specifically, when an operation of selecting a displayed thumbnail is detected, the output control unit 110 causes a playback unit to play back a content corresponding to the selected thumbnail, where the playback unit is suitable for that content. For example, when a touch operation performed on a displayed thumbnail is detected, the output control unit 110 causes a moving image player to play back a moving image corresponding to the thumbnail on which the touch operation has been performed.

(Display Unit)

The display unit 112, which serves as an output unit, displays an image according to an instruction from the output control unit 110. Specifically, the display unit 112 displays a thumbnail generated by the thumbnail generation unit 106 and an object associated with location information according to an instruction from the output control unit 110.

(Sound Output Unit)

The sound output unit 114, which serves as an output unit, outputs a sound according to an instruction from the output control unit 110. Specifically, the sound output unit 114 output a sound associated with audio information according to an instruction from the output control unit 110.

1-3. Process by Apparatus

Next, a process performed by the information processing apparatus 100 according to the embodiment of the present disclosure will be described.

(General Process)

Figure 7:
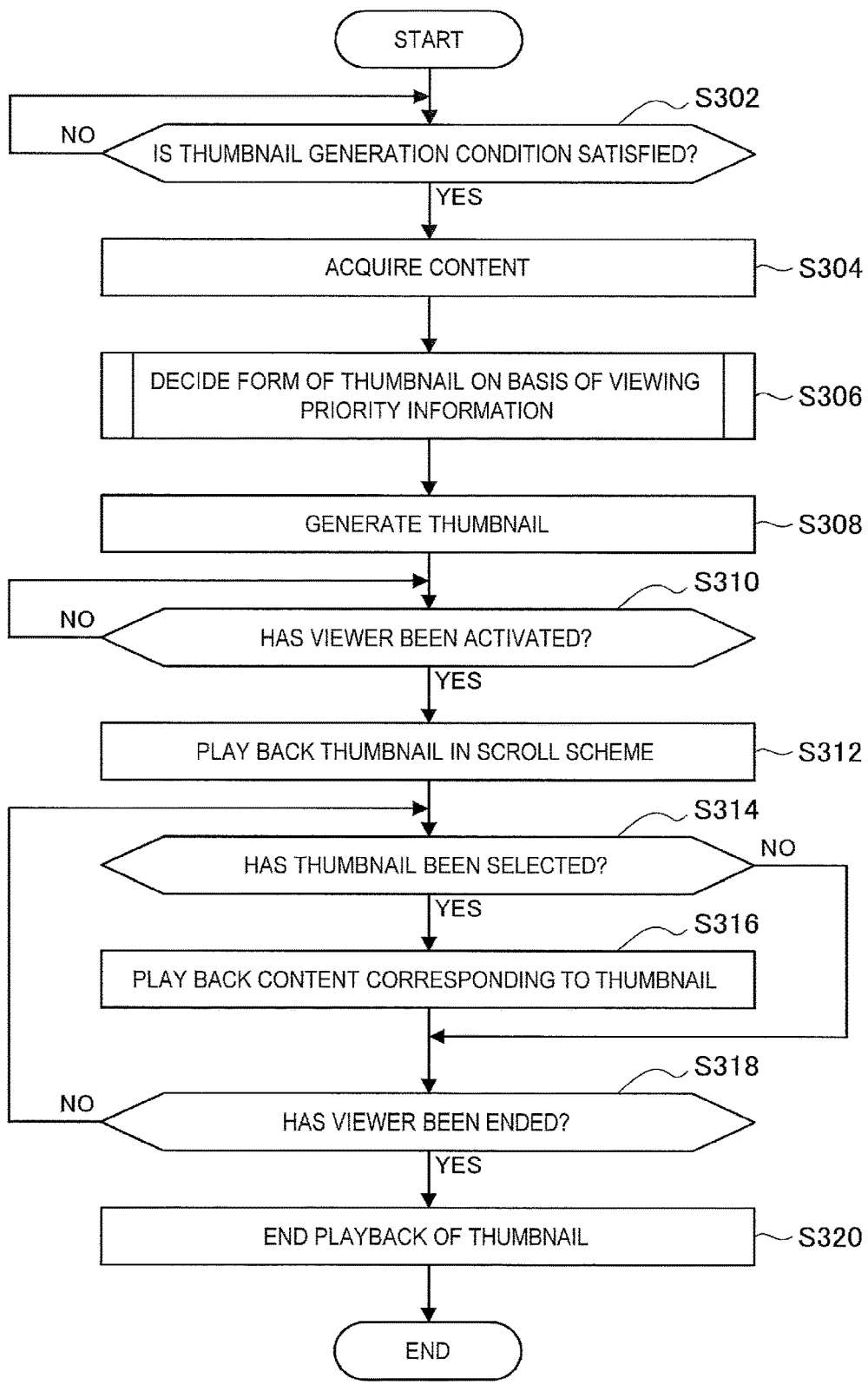
FIG. 7 is a flowchart showing the concept of a general process of an information processing apparatus according to an embodiment of the present disclosure.

Firstly, a general process of the information processing apparatus 100 will be described with reference to FIG. 7. FIG. 7 is a flowchart showing the concept of the general process of the information processing apparatus 100 according to the embodiment of the present disclosure.

The information processing apparatus 100 determines whether or not the thumbnail generation condition is satisfied (step S302). Specifically, the thumbnail generation unit 106 acquires time information, location information, even information of a scheduler, and the like, and determines whether or not the thumbnail generation condition is satisfied, on the basis of the acquired items of information.

If it is determined that the thumbnail generation condition is satisfied, the information processing apparatus 100 acquires a content (step S304). Specifically, if it is determined that the thumbnail generation condition is satisfied, the thumbnail generation unit 106 acquires a stored content from the storage unit 104.

Next, the information processing apparatus 100 decides the form of a thumbnail on the basis of the viewing priority information (step S306). Specifically, the thumbnail generation unit 106 decides the size, shape, or brightness of the thumbnail on the basis of the viewing priority information of the acquired content. Note that the viewing priority information may be acquired as information accompanying the content, along with the content, or separately from the content.

Next, the information processing apparatus 100 generates the thumbnail (step S308). Specifically, the thumbnail generation unit 106 generates the thumbnail in the decided form on the basis of the content.

Note that steps S302 to S308 may be performed as a background process in parallel to other processes of the information processing apparatus 100.

The information processing apparatus 100 determines whether or not a viewer has been activated (step S310). Specifically, the output control unit 110 determines whether or not the operation detection unit 108 has detected an operation of activating a thumbnail playback viewer.

If it is determined that the viewer has been activated, the information processing apparatus 100 plays back the thumbnail in a scrolling scheme (step S312). Specifically, the output control unit 110 causes the display unit 112 to display a thumbnail playback screen, and display generated thumbnails on the screen in chronological order at a predetermined speed. Note that the output control unit 110 may cause the display unit 112 to scroll according to the user's operation. For example, the output control unit 110 may cause the display unit 112 to display a scroll bar, and when detecting an operation on the scroll bar, cause the display unit 112 to scroll thumbnails according to the operation performed on the scroll bar. The user's operation may be a swipe operation on the screen on which thumbnails are displayed.

Next, the information processing apparatus 100 determines whether or not there has been an operation of selecting a thumbnail (step S314). Specifically, the output control unit 110 determines whether or not the operation detection unit 108 has detected a touch operation performed on any displayed thumbnail.

If it is determined that a thumbnail has been selected, the information processing apparatus 100 plays back a content corresponding to the selected thumbnail (step S316). Specifically, if it is determined that a touch operation has been detected, the output control unit 110 causes a playback unit to play back a content corresponding to a thumbnail on which the touch operation has been performed, where the playback unit is suitable for that content.

Next, the information processing apparatus 100 determines whether or not the viewer has been ended (step S318). Specifically, the output control unit 110 determines whether or not the operation detection unit 108 has detected an operation of ending the thumbnail playback viewer.

If it is determined that the viewer has been ended, the information processing apparatus 100 ends playback of the thumbnail (step S320). Specifically, the output control unit 110 ends playback of the thumbnail, and closes the thumbnail playback screen.

(Process of Deciding Form of Thumbnail)

Figure 8:
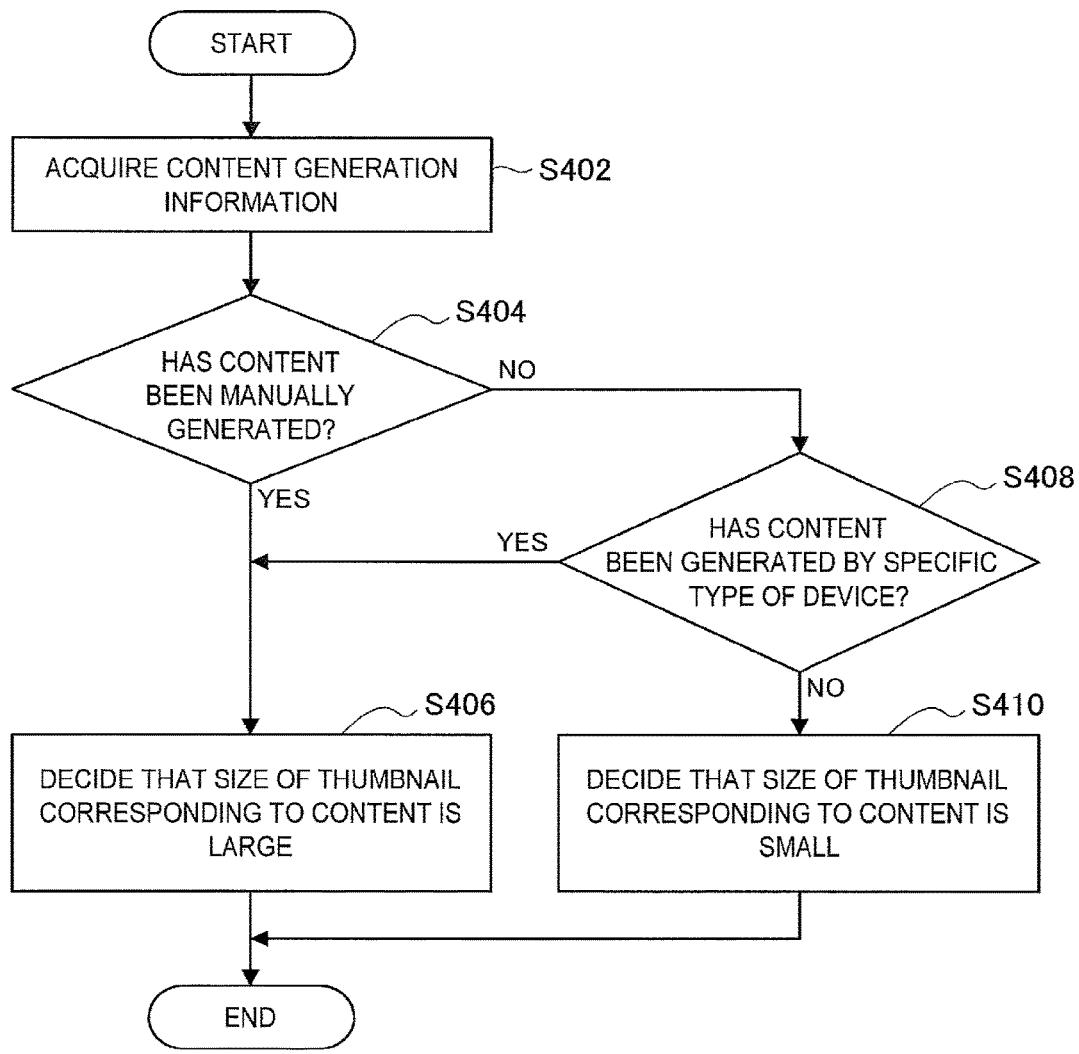
FIG. 8 is a flowchart showing the concept of a process of deciding a form of a thumbnail, which is performed by an information processing apparatus according to an embodiment of the present disclosure.

Next, a process of deciding the form of a thumbnail, which is performed by the information processing apparatus 100, will be described in detail with reference to FIG. 8 (step S306 in FIG. 6). FIG. 8 is a flowchart showing the concept of the thumbnail form decision process performed by the information processing apparatus 100 according to the embodiment of the present disclosure.

The information processing apparatus 100 acquires the content generation information (step S402). Specifically, the thumbnail generation unit 106 acquires the content generation information of the acquired content from the meta-information of the content.

Next, the information processing apparatus 100 determines whether or not the content has been manually generated (step S404). Specifically, the thumbnail generation unit 106 determines whether or not the content generation mode indicated by the content generation information is the manual generation mode.

If it is determined that the content has been manually generated, the information processing apparatus 100 decides that the size of a thumbnail corresponding to the content is "large" (step S406). Specifically, if it is determined that the content generation mode indicated by the content generation information is the manual generation mode, the information processing apparatus 100 decides that the size of a thumbnail corresponding to the content is "large."

If it is determined that the content has not been manually generated, the information processing apparatus 100 determines whether or not the content has been generated by a specific type of device (step S408). Specifically, the thumbnail generation unit 106 determines whether or not the type of the device which has generated the content indicated by the content generation information is a smartphone.

If it is determined that the content has been generated by any specific type of apparatus, the process proceeds to step S406. Otherwise, the information processing apparatus 100 decides that the size of a thumbnail corresponding to the content is "small." Specifically, if it is determined that the type of the device which has generated the content indicated by the content generation information is a smartphone, the thumbnail generation unit 106 decides that the size of a thumbnail corresponding to the content is "large." Otherwise, the thumbnail generation unit 106 decides that the size of a thumbnail corresponding to the content is "small."

1-4. Summary of Embodiment of the Present Disclosure

Thus, according to the above embodiment of the present disclosure, the information processing apparatus 100 decides the form of each of a plurality of thumbnails respectively based on a plurality of contents, on the basis of the viewing priority information which has an influence on the viewing priority of the content corresponding to the thumbnail. Thereafter, the information processing apparatus 100 causes the output unit to output the thumbnails in the respective decided forms. Therefore, the visibility of each thumbnail can be controlled according to the viewing priority. Specifically, the higher the viewing priority, the higher the visibility of a thumbnail which is output. The lower the viewing priority, the lower the visibility of a thumbnail which is output. Therefore, the visibility of a thumbnail which the user desires to view is increased while both thumbnails which the user is more likely to desire to view and thumbnails which the user is less likely to desire to view are comprehensively output. Therefore, all contents can be grasped while the user's burden of viewing the contents can be reduced.

The above form of a thumbnail includes the size, shape, or brightness. In general, the visibility of a thumbnail varies depending on the size, shape, or brightness of the thumbnail. Therefore, by controlling these factors according to the viewing priority, the visibility of a thumbnail can be controlled. If the viewing priority is visually represented, the user can intuitively determine which thumbnail they should view.

The information processing apparatus 100 scrolls the thumbnails so that the thumbnails are arranged in the scroll direction according to the attribute information of contents corresponding to the thumbnails. Therefore, even if not all thumbnails can be displayed on a single screen in a size which is visible to the user, all of these thumbnails can be viewed by the user scrolling the thumbnails. Because thumbnails are arranged according to attribute information of the respective contents, the user can intuitively understand a relationship between the thumbnails. Although, in the above embodiment, an example in which thumbnails are arranged in chronological order has been described, thumbnails may be arranged according to other attribute information of contents such as location information, event information, or the like. Alternatively, thumbnails may be arranged according to the level of the viewing priority.

When a difference in location information of contents corresponding to adjacent thumbnails is a predetermined range or more, the information processing apparatus 100 causes the display unit 112 to display the location information of a content corresponding to a thumbnail which is output later. Therefore, the user who is viewing thumbnails can know a location related to a thumbnail which is being displayed, without an additional operation. Furthermore, a single piece of location information is displayed as a representative of the predetermined range. Therefore, compared to a case where location information is displayed for every thumbnail, a decrease in visibility can be reduced or prevented. In particular, when thumbnails based on contents generated in an event including movements such as travels or the like are played back, the user can know a boundary between each event on the basis of the location information.

The information processing apparatus 100, when displaying the location information of contents corresponding to the thumbnails, changes the form of the thumbnail which is output later into a form different from the decided form. Therefore, not only the location information is displayed, but also the form of the thumbnail is emphasized. Therefore, the user can be easily aware that a location related to a thumbnail is different from those of thumbnails which have been so far output.

The viewing priority information includes information related to generation of the contents. The degree of preference for viewing a thumbnail may vary depending on the process of generation of a content corresponding to the thumbnail. Therefore, if the form of a thumbnail is decided based on the content generation information, the form of the thumbnail can be made more accurately suitable for an estimated degree of viewing preference. Therefore, a thumbnail having a relatively higher visibility is appropriately selected, and therefore, a mismatch with the user's need can be reduced or prevented.

The information related to generation of a content includes information which varies depending on an entity which has issued an instruction to generate the content. It is considered that a content which the user has intended to produce has a higher degree of viewing preference than that of a content which has been automatically produced. For example, it is considered that when the entity which has issued an instruction to generate a content, the viewing priority of the content is higher than when the entity is a device. Therefore, if the information which varies depending on the entity is used in the process of deciding the form of a thumbnail, the accuracy of correspondence between an estimated degree of viewing preference and the form of a thumbnail can be further improved. Therefore, the user can find a thumbnail which they desire to view, at a glance, while grasping all thumbnails, resulting in an improvement in viewing efficiency.

The information related to generation of a content includes the type of a device which has generated the content. Examples of the device which generates a content include a device which generates a content according to the user's intention, and a device which automatically generates a content. Therefore, if the type of a device is used in the process of deciding the form of a thumbnail, the accuracy of correspondence between an estimated degree of viewing preference and the form of a thumbnail can be further improved. Therefore, the user can find a thumbnail which they desire to view, at a glance, while grasping all thumbnails, resulting in an improvement in viewing efficiency.

1-5. Variations

In the foregoing, an embodiment of the present disclosure has been described. Note that the present disclosure is not limited to the above embodiment. First to sixth variations of the above embodiment of the present disclosure will now be described.

(First Variation)

Figure 9:
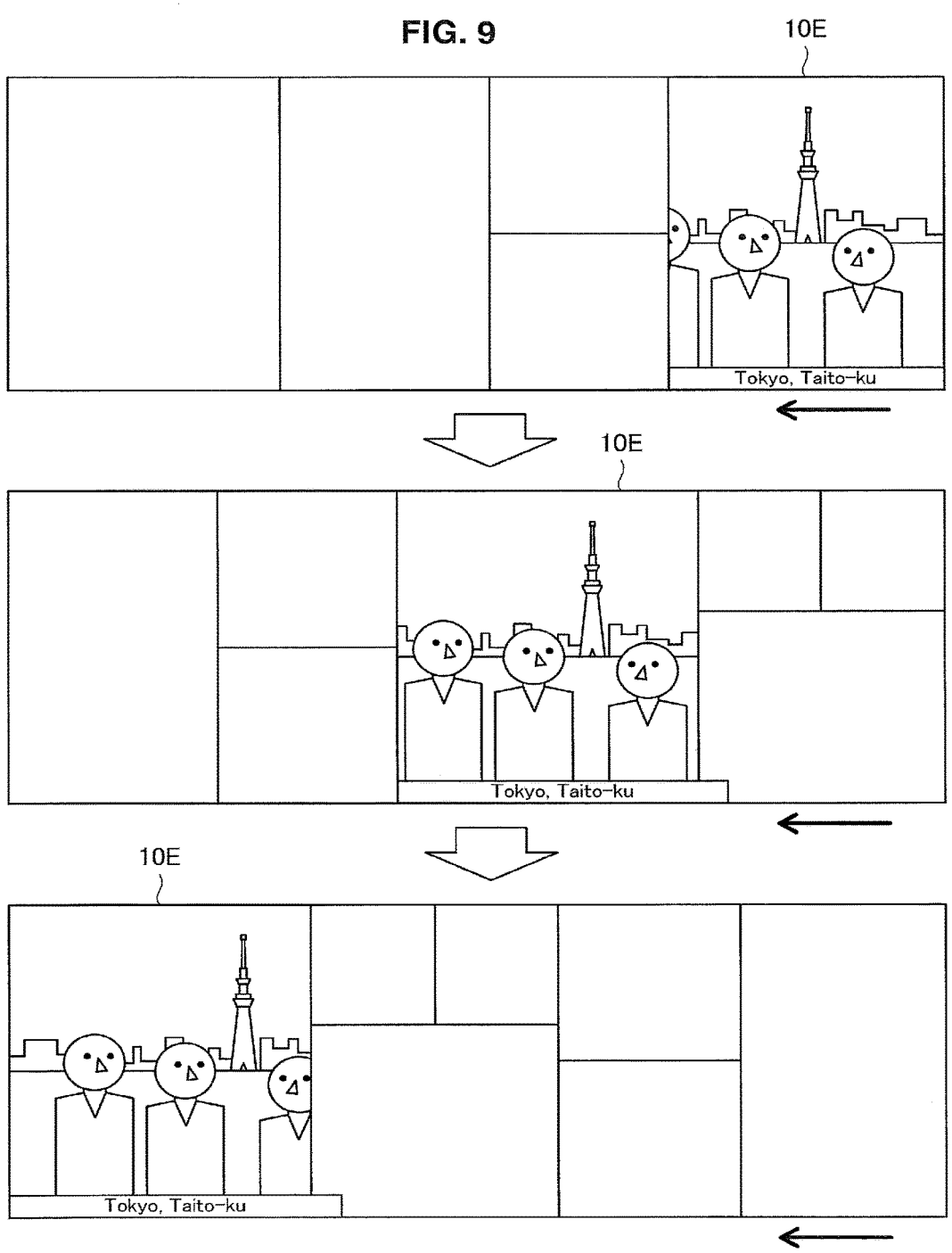
FIG. 9 is a diagram showing an example in which a video range of a thumbnail is changed according to scrolling by an information processing apparatus according to a first variation of an embodiment of the present disclosure.

In a first variation of the above embodiment of the present disclosure, the information processing apparatus 100 may control the form of a thumbnail according to scrolling of the thumbnail. Specifically, the output control unit 110 changes the display range of a video of a thumbnail according to scrolling of the thumbnail. Furthermore, the process of this variation will be described in greater detail with reference to FIG. 9. FIG. 9 is a diagram showing an example in which the video range of a thumbnail is changed according to scrolling by the information processing apparatus 100 according to the first variation of the above embodiment of the present disclosure.

Initially, the output control unit 110 decides the display range of a video of a thumbnail which is output, according to the scroll position. Specifically, the output control unit 110 decides a panning start position related to a video of a thumbnail at a scroll position where the output of a thumbnail is started. For example, a panning position shown in the upper section of FIG. 9 is decided as a panning start position at a time when the display of a thumbnail 10E is started. Note that the panning start position may be added as schedule information.

Thereafter, the output control unit 110 scrolls a thumbnail, and at the same time, changes the display range of a video, depending on the scroll position, during playback of the thumbnail. Specifically, the output control unit 110 causes a video of a thumbnail for which a panning start position has been set to pan according to scrolling. For example, when the display of the thumbnail 10E is started as shown in the upper section of FIG. 9, the video of the thumbnail 10E starts panning from the panning start position. Next, as shown in the middle section of FIG. 9, the video of the thumbnail 10E pans leftward from the panning start position as scrolling proceeds from right to left in FIG. 9. Thereafter, when the thumbnail 10E reaches an end of the screen, the video of the thumbnail 10E ends panning.

Although, in FIG. 9, an example in which a video of a thumbnail pans has been described, tilting may be performed instead of or in addition to panning.

Alternatively, the output control unit 110 may change the display range of a video of a thumbnail irrespective of scrolling. For example, the output control unit 110 may change the display range of a video of a thumbnail with time or according to the user's operation.

Thus, according to the first variation of the above embodiment of the present disclosure, the information processing apparatus 100 changes the display range of a video of a thumbnail according to scrolling of the thumbnail. Therefore, even when the size of a thumbnail is smaller than the size of a video, the user can view the entirety of the video. Thus, it is not necessary to reduce a video in order to cause the entirety of the video to be visible. Therefore, the visibility can be maintained or improved without a decrease in the amount of information.

(Second Variation)

Figure 10:
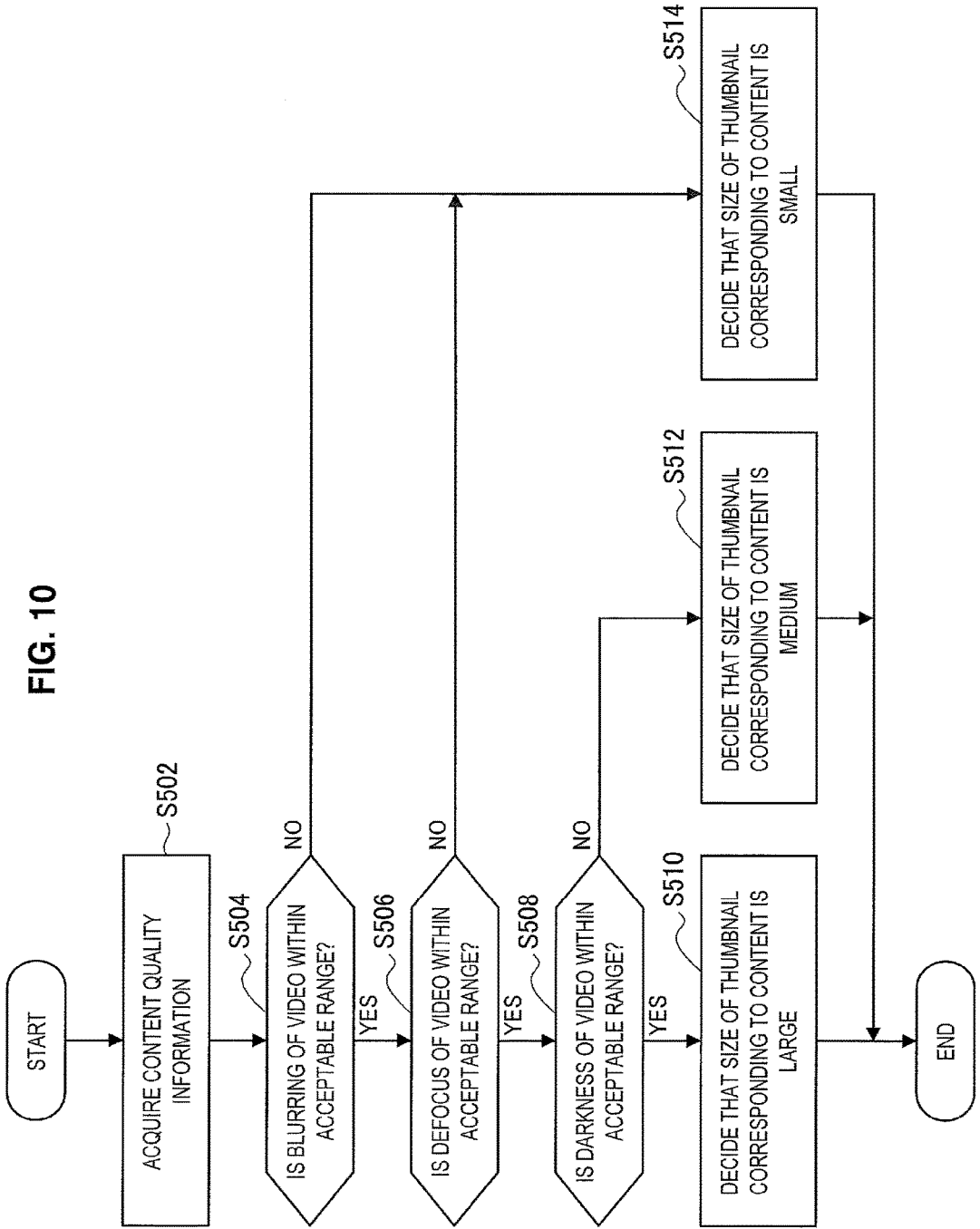
FIG. 10 is a flowchart showing the concept of a process of deciding a form of a thumbnail on the basis of content quality information, which is performed by an information processing apparatus according to a second variation of an embodiment of the present disclosure.

In a second variation of the above embodiment of the present disclosure, the viewing priority information may be quality information of a content. Specifically, the output control unit 110 decides the form of a thumbnail on the basis of the quality information of a content. For example, the quality information of a content is information indicating the degree of disturbance of the content. Examples of the disturbance of a content include blurring of a video, defocus of a video, and darkness of a video. The process of this variation will be described in greater detail with reference to FIG. 10. FIG. 10 is a flowchart showing the concept of a process of deciding the form of a thumbnail on the basis of the quality information of a content, which is performed by an information processing apparatus 100 according to the second variation of the above embodiment of the present disclosure. Note that substantially the same steps as those in the above process will not be described.

The information processing apparatus 100 acquires the quality information of a content (step S502). Specifically, the thumbnail generation unit 106 acquires, as the quality information of an acquired content, information from which the degree of blurring of a video, the degree of defocus of a video, and the darkness of a video can be grasped. For example, the thumbnail generation unit 106 acquires the above three items of information by performing an image analysis process. Note that the above three items of information may be acquired from an external apparatus which performs the image analysis process through communication.

Next, the information processing apparatus 100 determines whether or not the blurring of a video is within an acceptable range, on the basis of the content quality information (step S504). Specifically, the thumbnail generation unit 106 determines whether or not a value indicating the degree of blurring of a video indicated by the content quality information is lower than or equal to an acceptable value, i.e. whether or not the blurring is small.

If it is determined that the blurring of the video is within the acceptable range, the information processing apparatus 100 determines whether or not the defocus of the video is within an acceptable range, on the basis of the content quality information (step S506). Specifically, if it is determined that the degree of blurring of the video is lower than or equal to an acceptable value, the thumbnail generation unit 106 determines whether or not a value indicating the degree of defocus of the video indicated by the content quality information is lower than or equal to an acceptable value, i.e. whether or not the defocus is small. Note that the thumbnail generation unit 106 may determine whether or not a defocus portion of the video is in an acceptable portion (e.g., the background, an object which has already been completely viewed, etc.).

If it is determined that the defocus of the video is within the acceptable range, the information processing apparatus 100 determines whether or not the darkness of the video is within an acceptable range, on the basis of the content quality information (step S508). Specifically, if it is determined that a value indicating a degree of the defocus of the video is lower than or equal to an acceptable value, the thumbnail generation unit 106 determines whether or not a value indicating the darkness of the video indicated by the content quality information is lower than or equal to an acceptable value, i.e. whether or not the video is bright enough for the user to view. Note that the darkness of a video may depend on the time or place when or where the video is taken. For example, the acceptable value set for a content taken during night may be higher than the acceptable value set for a content taken during day.

If it is determined that the darkness of the video is within the acceptable range, the information processing apparatus 100 decides that the size of a thumbnail corresponding to the content is "large" (step S510). If, in step S508, the information processing apparatus 100 determines that the darkness of the video is out of the acceptable range, the information processing apparatus 100 decides that the size of a thumbnail corresponding to the content is "medium" (step S512).

If, in step S504, the information processing apparatus 100 determines that the blurring of the video is out of the acceptable range, or in step S506, determines that the defocus of the video is output of the acceptable range, the information processing apparatus 100 decides that the size of a thumbnail corresponding to the content is "small" (step S514).

Note that the form of a thumbnail may be dynamically decided according to the level of the quality of a content. For example, the thumbnail generation unit 106 may decide, as the size of a thumbnail, a size calculated on the basis of the degree of blurring of a video.

In the foregoing, an example in which there are a plurality of items of quality information has been described. Alternatively, the form of a thumbnail may be decided on the basis of one of the plurality of items of content quality information.

Thus, according to the second variation of the above embodiment of the present disclosure, the viewing priority information includes the content quality information. The degree of preference of viewing a thumbnail generally varies depending on the quality of a content corresponding to the thumbnail. Therefore, by deciding the form of a thumbnail on the basis of the content quality information, the form of the thumbnail can be caused to accurately match an estimated degree of viewing preference. Therefore, a thumbnail having a relatively higher visibility is appropriately selected, and therefore, a mismatch with the user's need can be reduced or prevented.

The content quality information also includes information from which the degree of disturbance of a content can be grasped. In general, users do not desire to view a disturbed content. Therefore, by outputting a thumbnail in a form which depends on the degree of disturbance of a content, the accuracy of correspondence between an estimated degree of viewing preference and the form of a thumbnail can be improved.

The disturbance of a content includes blurring of a video, defocus of a video, or darkness of a video. Therefore, by deciding the form of a thumbnail on the basis of the quality of a content which the user is easily aware of, the accuracy of correspondence between an estimated degree of viewing preference and the form of a thumbnail can be further improved. Therefore, the user can find a thumbnail which they desire to view, at a glance, while grasping all thumbnails, resulting in an improvement in viewing efficiency.

(Third Variation)

Figure 11:
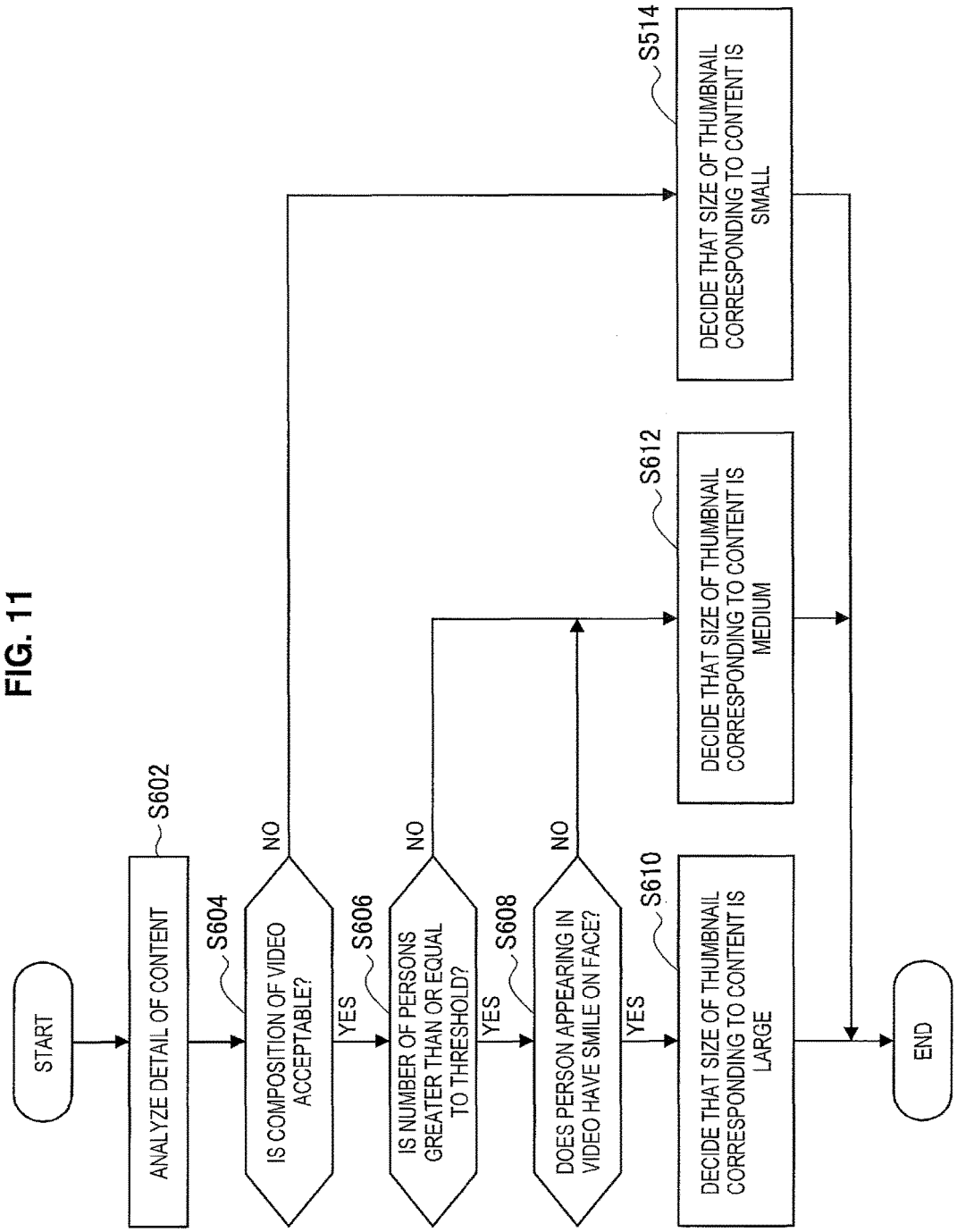
FIG. 11 is a flowchart showing the concept of a process of deciding a form of a thumbnail on the basis of content detail information, which is performed by an information processing apparatus according to a third variation of an embodiment of the present disclosure.

In a third variation of the above embodiment of the present disclosure, the viewing priority information may be information indicating a detail of a content (hereinafter also referred to as "content detail information"). Specifically, the output control unit 110 decides the form of a thumbnail on the basis of the content detail information. Examples of a detail of a content include a form of an object appearing in a video or a composition of the video. Furthermore, the process of this variation will be described in detail with reference to FIG. 11. FIG. 11 is a flowchart showing the concept of a process of deciding the form of a thumbnail on the basis of the content detail information, which is performed by an information processing apparatus 100 according to the third variation of the above embodiment of the present disclosure. Note that substantially the same steps as those in the above process will not be described.

The information processing apparatus 100 acquires the content detail information (step S602). Specifically, as the acquired content detail information, the thumbnail generation unit 106 acquires information from which the form of an object appearing in a video is grasped and information about evaluation of the composition of the video. For example, the thumbnail generation unit 106 performs an image analysis process to grasp the presence or absence of a person or specific building, the number of persons or buildings appearing in the video, and the composition of the entire video, and generate information for each of those features. Note that the content detail information may be acquired from an external apparatus which performs the image analysis process, through communication.

Next, the information processing apparatus 100 determines whether or not the composition of the video is acceptable, on the basis of the content detail information (step S604). Specifically, the thumbnail generation unit 106 determines whether or not a score on an evaluation of the composition of the video indicated by the content detail information is greater than or equal to a threshold.

If it is determined that the composition of the video is acceptable, the information processing apparatus 100 determines whether or not the number of persons is larger than or equal to a threshold, on the basis of the content detail information (step S606). Specifically, if it is determined that the score on the evaluation of the composition of the video indicated by the content detail information is greater than or equal to the threshold, the thumbnail generation unit 106 determines whether or not the number of persons appearing in the video indicated by the content detail information is larger than or equal to the threshold.

If it is determined that the number of persons is larger than or equal to the threshold, the information processing apparatus 100 determines whether or not a person appearing in the video has a smile on their face, on the basis of the content detail information (step S608). Specifically, if it is determined that the number of persons is larger than or equal to the threshold, the thumbnail generation unit 106 determines whether or not a score on an evaluation of the smile of a person indicated by the content detail information is greater than or equal to a threshold. Note that, instead of or in addition to a person's smile, the orientation of the face or the line of sight of a person may be used as a score on the evaluation.

If it is determined that a person appearing in the video has a smile on their face, the information processing apparatus 100 decides that the size of a thumbnail corresponding to the content is "large" (step S610). If, in step S606, the information processing apparatus 100 determines that the number of persons is less than the threshold, or in step S608, if it is determined that that a person appearing has a smile on their face, the information processing apparatus 100 decides that the size of a thumbnail corresponding to the content is "medium" (step S612).

If, in step S604, the information processing apparatus 100 determines that the composition of the video is not acceptable, the information processing apparatus 100 decides that the size of a thumbnail corresponding to the content is "small" (step S614).

Note that the form of a thumbnail may be dynamically decided according to the level of an evaluation of a detail of a content. For example, the thumbnail generation unit 106 may decide a size which is calculated according to the number of persons appearing in a video or the degree of a smile, as the size of a thumbnail.

In the foregoing, an example in which there are a plurality of items of content detail information has been described. Alternatively, the form of a thumbnail may be decided on the basis of one of the plurality of items of content detail information.

Thus, according to the third variation of the above embodiment of the present disclosure, the viewing priority information includes information indicating a detail of a content. In general, the degree of preference of viewing a thumbnail varies depending on a detail of a content corresponding to the thumbnail. Therefore, by deciding the form of a thumbnail on the basis of the content detail information, the form of the thumbnail can be caused to accurately match an estimated degree of viewing preference. Therefore, a thumbnail having a relatively higher visibility is appropriately selected, and therefore, a mismatch with the user's need can be reduced or prevented.

The detail of a content includes the form of an object appearing in a video or the composition of the video. Therefore, by deciding the form of a thumbnail according to whether or not an object which the user desires to view is present or how well the object appears, which it is considered have a significant influence on the degree of viewing preference, the form of the thumbnail can be caused to more accurately match an estimated degree of viewing preference. Therefore, the user can find a thumbnail which they desire to view, at a glance, while grasping all thumbnails, resulting in an improvement in viewing efficiency.

(Fourth Variation)

Figure 12:
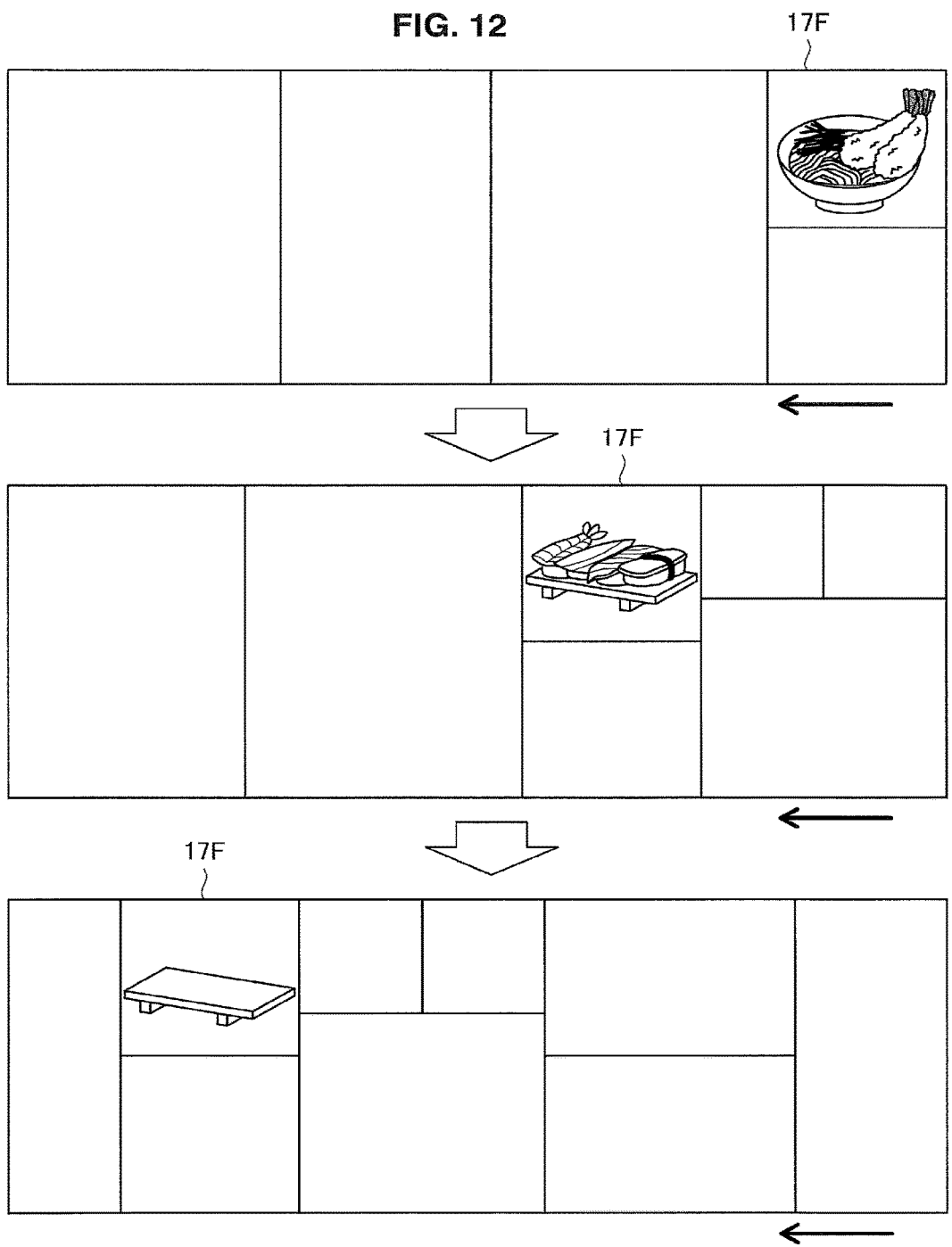
FIG. 12 is a diagram showing an example in which an information processing apparatus according to a fourth variation of an embodiment of the present disclosure displays a thumbnail based on a plurality of contents.

In a fourth variation of the above embodiment of the present disclosure, a thumbnail may be generated on the basis of a plurality of contents. Specifically, the thumbnail generation unit 106 generates a single thumbnail (hereinafter referred to as a "composite thumbnail") on the basis of a plurality of similar contents. A process of this variation will be described with reference to FIG. 12. FIG. 12 is a diagram showing an example in which an information processing apparatus 100 according to the fourth variation of the above embodiment of the present disclosure displays a thumbnail based on a plurality of contents.

The thumbnail generation unit 106 selects a plurality of similar contents from a plurality of contents on the basis of predetermined information. Specifically, the thumbnail generation unit 106 selects contents which are similar in content generation information, content quality information, content detail information or other attribute information. For example, selected are contents which are similar in the type of an object appearing in a video as a detail of a content (e.g. food (noodles, sushi, etc.) shown in FIG. 12).

Next, the thumbnail generation unit 106 generates a composite thumbnail in which each of the selected contents is visible. Specifically, the thumbnail generation unit 106 generates a thumbnail in which an output content can be switched between each of the selected contents. For example, a thumbnail 17F shown in FIG. 12 is generated in which an output content is switched according to scrolling of the thumbnail.

Note that a composite thumbnail may be generated on the basis of contents of different types. Specifically, the thumbnail generation unit 106 may generate a thumbnail on the basis of a still image and a moving image. For example, the thumbnail generation unit 106 generates a composite thumbnail in which a still image, and an extended version of a plurality of moving images generated from moving images, are alternately switched.

In the foregoing, an example in which a composite thumbnail is a thumbnail in which an output content is switched has been described. Alternatively, a thumbnail in which a plurality of selected contents are combined, or a thumbnail in which the plurality of contents are simultaneously output as a portion of the thumbnail, may be employed.

Thus, according to the fourth variation of the above embodiment of the present disclosure, a thumbnail is generated on the basis of a plurality of contents. Therefore, a plurality of contents can be viewed in a single thumbnail. Therefore, the number of thumbnails is reduced. As a result, all contents can be grasped while the visibility of each thumbnail is improved.

The plurality of contents include similar contents. Therefore, because similar contents are grouped into a single composite thumbnail, the user can easily grasp details of the composite thumbnail without viewing all contents corresponding to the composite thumbnail. Therefore, the efficiency of viewing a thumbnail (contents) can be improved.

The above thumbnail which is generated on the basis of a plurality of contents includes a thumbnail in which an output content is switched between each of the plurality of contents. Therefore, the entire output region of a thumbnail is used for outputting of the contents. As a result, the visibility of each content corresponding to a composite thumbnail can be maintained or improved. Therefore, both the visibility and viewing efficiency of a thumbnail (contents) can be achieved.

(Fifth Variation)

Figure 13:
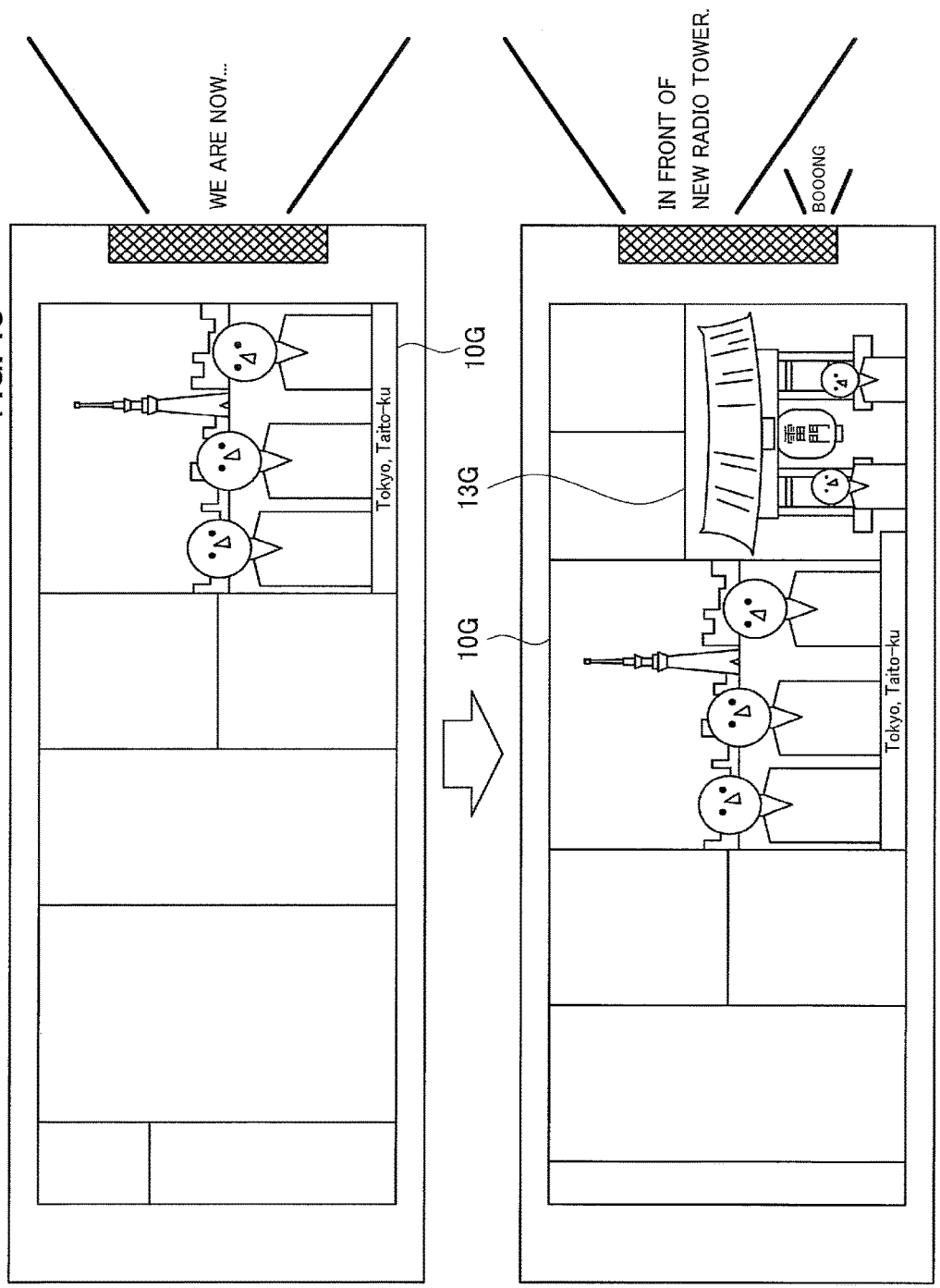
FIG. 13 is a diagram showing an example in which there are different forms of a sound corresponding to a thumbnail in an information processing apparatus according to a fifth variation of an embodiment of the present disclosure.

In a fifth variation of the above embodiment of the present disclosure, the form of a thumbnail which is controlled may include the form of a sound corresponding to the thumbnail. Specifically, the thumbnail generation unit 106 decides the form of a sound corresponding to a thumbnail on the basis of the viewing priority information. A process of this variation will be described with reference to FIG. 13. FIG. 13 is a diagram showing an example in which there are different forms of a sound corresponding to a thumbnail in an information processing apparatus 100 according to the fifth variation of the above embodiment of the present disclosure.

The thumbnail generation unit 106 decides the form of a sound corresponding to a thumbnail on the basis of the viewing priority information, and generates the thumbnail. Specifically, the thumbnail generation unit 106 decides the volume of a sound of a thumbnail on the basis of the level of the viewing priority. For example, in the thumbnail generation unit 106, the volume of a sound associated with a video of a thumbnail corresponding to a content in which the number of persons appearing in the video is greater than or equal to a threshold (e.g., a thumbnail 10G shown in FIG. 13) is greater than the volume of a sound associated with a thumbnail corresponding to a content in which the number of persons is less than the threshold (e.g., a thumbnail 13G shown in FIG. 13).

Thereafter, the output control unit 110 plays back the thumbnail having the decided form. Specifically, the output control unit 110 causes the sound output unit 114 to output a sound associated with the thumbnail at a timing when the thumbnail is displayed on the screen. For example, as shown in the upper section of FIG. 13, the output control unit 110 causes the sound output unit 114 to start outputting a sound associated with the video of the thumbnail 10G when the thumbnail 10G starts being displayed on the screen by scrolling. The output control unit 110 also causes the sound output unit 114 to start outputting a sound associated with the thumbnail 13G when another thumbnail 13G starts being displayed on the screen by scrolling. Here, as described above, the volume of the sound associated with the thumbnail 13G is set to be smaller than the volume of the sound associated with the thumbnail 10G. Therefore, as shown in the lower section of FIG. 13, the sound of a bell associated with the thumbnail 13G is output lower than a sound associated with the thumbnail 10G.

Thus, according to the fifth variation of the above embodiment of the present disclosure, the form of a thumbnail includes the form of a sound associated with the thumbnail. Therefore, the form of a sound is controlled according to the viewing priority. As a result, the user's attention can be auditorily attracted to a content which the user would desire to view. Note that the visual form of a content may be controlled together with the control of the form of a sound. In this case, a plurality of sensory organs are stimulated, and therefore, the user's attention can be more reliably attracted.

2. HARDWARE CONFIGURATION OF INFORMATION PROCESSING APPARATUS ACCORDING TO EMBODIMENT OF THE PRESENT DISCLOSURE

In the foregoing, the information processing apparatus 100 according to each embodiment of the present disclosure has been described. The above process of the information processing apparatus 100 is implemented by cooperation of software, and hardware described below of the information processing apparatus 100.

Figure 14:
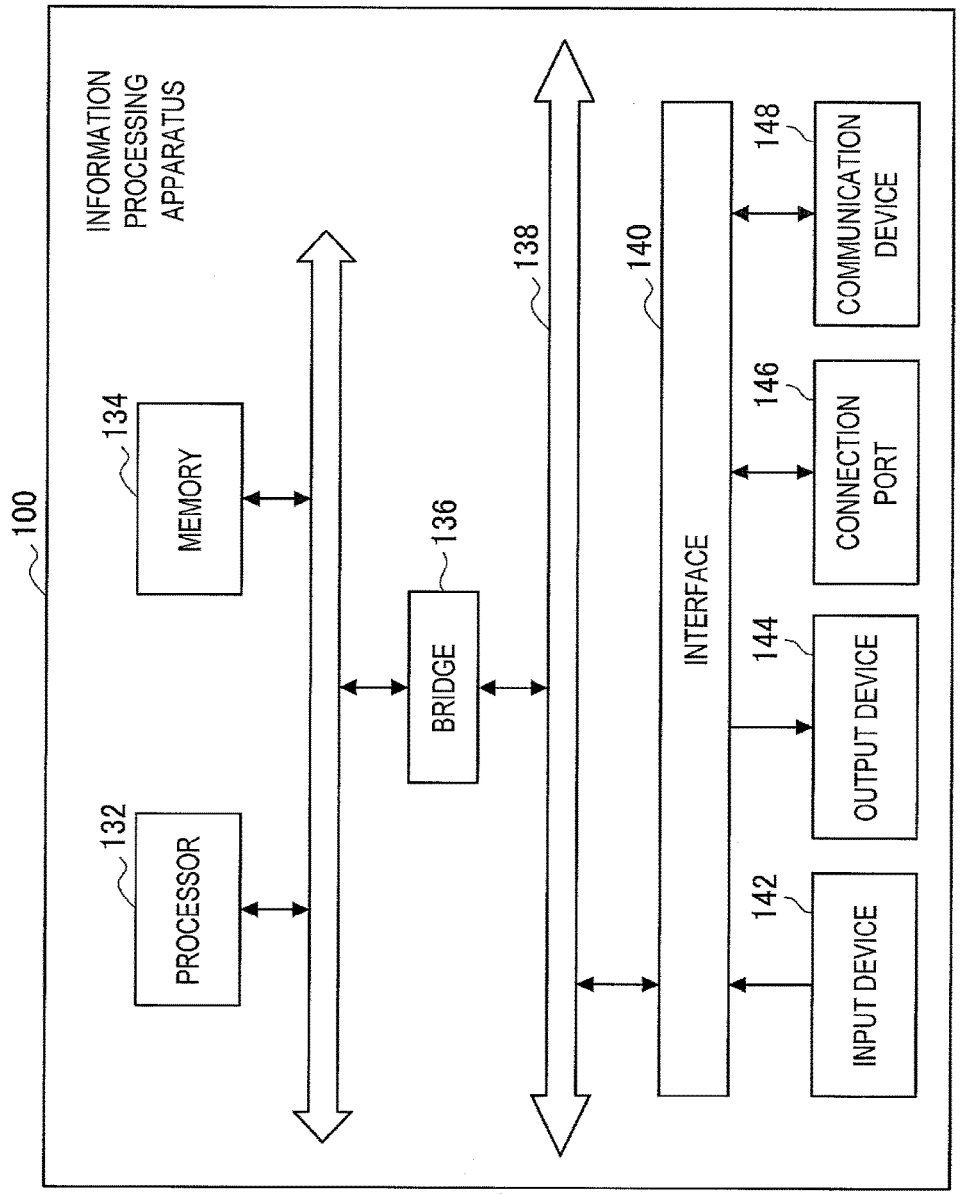
FIG. 14 is a diagram for describing a hardware configuration of an information processing apparatus according to an embodiment of the present disclosure.

FIG. 14 is a diagram for describing a hardware configuration of the information processing apparatus 100 according to the embodiment of the present disclosure. As shown in FIG. 14, the information processing apparatus 100 includes a processor 132, a memory 134, a bridge 136, a bus 138, an interface 140, an input device 142, an output device 144, a connection port 146, and a communication device 148.

(Processor)

The processor 132, which functions as a calculation processing device, cooperates with various programs to provide the functions of the thumbnail generation unit 106, the operation detection unit 108, and the output control unit 110 in the information processing apparatus 100. The processor 132 uses a control circuit to execute a program stored in the memory 134 or other storage media, and thereby provide various logical functions of the information processing apparatus 100. For example, the processor 132 may be a central processing unit (CPU), graphics processing unit (GPU), digital signal processor (DSP), or system-on-a-chip (SoC).

(Memory)

The memory 134 stores programs, calculation parameters, and the like which are used by the processor 132. For example, the memory 134, which includes a random access memory (RAM), temporarily stores a program which is executed by the processor 132, or a parameter or the like which is changed as appropriate during the execution. The memory 134, which also includes a read only memory (ROM), provides the function of the storage unit 104 using the RAM and the ROM. Note that an external storage device may be used as a portion of the memory 134 with the help of the connection port 146, the communication device 148, or the like.

Note that the processor 132 and the memory 134 are connected together by internal buses including a CPU bus and the like.

(Bridge and Bus)

The bridge 136 connects buses. Specifically, the bridge 136 connects an internal bus to which the processor 132 and the memory 134 are connected, with the bus 138 to which the interface 140 is connected.

(Input Device)

The input device 142 is used by the user to operate the information processing apparatus 100, or input information into the information processing apparatus 100. For example, the input device 142 includes an input mechanism which is used by the user to input information, an input control circuit which generates an input signal on the basis of the user's input, and outputs the input signal to the processor 132, and the like. Note that the input mechanism may be a mouse, keyboard, touchscreen, switch, lever, microphone, or the like. The user of the information processing apparatus 100 can operate the input device 142 to input various items of data into the information processing apparatus 100 or instruct the information processing apparatus 100 to perform a process operation.

(Output Device)

The output device 144 is used to notify the user of information, and thereby provide the functions of the display unit 112 and the sound output unit 114. Specifically, the output device 144 includes a display device and a sound output device. For example, the output device 144 may be a device such as a liquid crystal display (LCD) device, organic light emitting diode (OLED) device, projector, loudspeaker, headphone, or the like, or a module for outputting to the device.

(Connection Port)

The connection port 146 is used to connect a device directly to the information processing apparatus 100. For example, the connection port 146 may be a Universal Serial Bus (USB) port, IEEE1394 port, Small Computer System Interface (SCSI) port, or the like. Alternatively, the connection port 146 may be an RS-232C port, optical audio terminal, High-Definition Multimedia Interface (HDMI (registered trademark)) port, or the like. By connecting an external device to the connection port 146, data may be exchanged between the information processing apparatus 100 and the external device.

(Communication Device)

The communication device 148 mediates communication between the information processing apparatus 100 and an external apparatus, and thereby provides the function of the communication unit 102. Specifically, the communication device 148 performs communication according to a wireless communication scheme. For example, the communication device 148 may perform wireless communication according to any wireless communication scheme, such as a short-range wireless communication scheme (e.g., Bluetooth (registered trademark), near field communication (NFC), wireless USB, TransferJet (registered trademark), etc.), cellular communication scheme (e.g., Wideband Code Division Multiple Access (WCDMA (registered trademark)), WiMAX (registered trademark), Long Term Evolution (LTE), LTE-A, etc.), or wireless local area network (LAN) scheme (e.g., Wi-Fi (registered trademark), etc.). The communication device 148 may also perform wired communication, such as signal line communication, wired LAN communication, or the like.

Note that the information processing apparatus 100 may not include a portion of the configuration described with reference to FIG. 14 or may have an additional configuration. All or a portion of the configuration described with reference to FIG. 14 may be integrated into a single-chip information processing module.

3. CONCLUSION

In the foregoing, according to the embodiment of the present disclosure, the visibility of a thumbnail can be controlled according to the viewing priority. Therefore, the visibility of a thumbnail which the user desires to view is increased while both thumbnails which the user is more likely to desire to view and thumbnails which the user is less likely to desire to view are comprehensively output. Therefore, all contents can be grasped while the user's burden of viewing can be reduced.

It should be understood by those skilled in the art that various modifications, combinations, sub-combinations and alterations may occur depending on design requirements and other factors insofar as they are within the scope of the appended claims or the equivalents thereof.

For example, in the above embodiment, it is assumed that a thumbnail having a decided form is generated. The present technology is not limited to this. For example, a generated thumbnail may be displayed in a decided form.

The viewing priority information described in the above embodiment may be a score on an evaluation of each item of information described as the viewing priority information, or the sum of the scores. For example, one or more of the content generation information, content quality information, and content detail information may be converted into numerical values, and the form of a thumbnail may be decided according to the sum of the numerical values thus obtained.

In the above embodiment, an example in which the content quality information is about the quality of a video has been described. Alternatively, the content quality information may be about the quality of a sound. For example, the quality of a content may be the amount of noise or a signal-to-noise ratio.

In the above embodiment, several examples in which the form of a thumbnail itself is controlled have been described. Alternatively, the form of a thumbnail which is controlled may be the form of a movement of the thumbnail. For example, the thumbnail generation unit 106 decides the speed of scrolling a thumbnail on the basis of the viewing priority information, and the output control unit 110 scrolls the thumbnail at the decided speed. In this case, for example, a thumbnail which the user would desire to view is relatively slowly scrolled, and other thumbnails are relatively quickly scrolled, and therefore, a period of time during which the thumbnail which the user would desire to view is viewed can be relatively elongated. Therefore, a thumbnail can be played back in a manner suitable for the user's need.

In the above embodiment, an example in which a display object is a thumbnail has been described. Alternatively, a display object may be an unprocessed content. For example, the output control unit 110 may place an unprocessed still image or moving image directly in a grid cell, and cause the display unit 112 to display the image.

In the above embodiment, an example in which a display object is displayed on the basis of a content generated by the content generation apparatus (camera) 200 has been described. Alternatively, a content which is displayed as a display object may be a content generated by the information processing apparatus (smartphone) 100. In other words, the above information processing system may include only the information processing apparatus 100.

Further, the effects described in this specification are merely illustrative or exemplified effects, and are not limitative. That is, with or in the place of the above effects, the technology according to the present disclosure may achieve other effects that are clear to those skilled in the art based on the description of this specification.

It should be noted that in the present disclosure, the operations described in the flow chart may be performed not only in time series in the described order but in parallel or individually. Further, it should be understood that the operations performed in time series may be performed in a different order from the described order.

A computer program for causing hardware built in the information processing apparatus 100 to exhibit a function equivalent to each functional configuration of the information processing apparatus 100 can be created. Furthermore, a storage medium storing the computer program is provided.

Additionally, the present technology may also be configured as below.

(1) An information processing apparatus including:

a decision unit configured to decide a form of each of a plurality of display objects based on a plurality of contents, on the basis of viewing priority information which has an influence on viewing priority of the content corresponding to the display object; and an output control unit configured to cause an output unit to output each of the plurality of display objects in the form decided by the decision unit.

(2) The information processing apparatus according to (1), wherein
the form includes a size, shape, or brightness of the display object.
(3) The information processing apparatus according to (1) or (2), wherein
the form includes a form of a sound associated with the display object.
(4) The information processing apparatus according to any one of (1) to (3), wherein
the output control unit scrolls the display objects, and
the display objects are arranged in a scroll direction according to attribute information of the contents corresponding to the display objects.
(5) The information processing apparatus according to (4), wherein
in a case where a difference in location information of the contents corresponding to the display objects that are adjacent to each other is a predetermined range or more, the output control unit causes a display unit to display the location information of the content corresponding to the display object which is to be output later.
(6) The information processing apparatus according to (5), wherein
when the location information of the contents corresponding to the display objects is displayed, the output control unit changes a form of the display object which is to be output later into a form different from the decided form.
(7) The information processing apparatus according to any one of (4) to (6), wherein
the output control unit changes a display range of a video of the display object according to scrolling of the display object.
(8) The information processing apparatus according to any one of (1) to (7), wherein
the viewing priority information includes information about generation of the content.
(9) The information processing apparatus according to (8), wherein
the information about generation of the content includes information which varies depending on an entity of an instruction to generate the content.
(10) The information processing apparatus according to (8) or (9), wherein
the information about generation of the content includes a type of a device which has generated the content.
(11) The information processing apparatus according to any one of (1) to (10), wherein
the viewing priority information includes quality information of the content.
(12) The information processing apparatus according to (11), wherein
the quality information of the content includes information from which a degree of disturbance of the content is grasped.
(13) The information processing apparatus according to (12), wherein
the disturbance of the content includes blurring of a video, defocus of a video, or darkness of a video.
(14) The information processing apparatus according to any one of (1) to (13), wherein
the viewing priority information includes information indicating a detail of the content.
(15) The information processing apparatus according to (14), wherein
the detail of the content includes a form of an object appearing in a video or a composition of the video.
(16) The information processing apparatus according to any one of (1) to (15), wherein
the display object is generated on the basis of the plurality of contents.
(17) The information processing apparatus according to (16), wherein
the plurality of contents include similar contents.
(18) The information processing apparatus according to (16) or (17), wherein
the display object generated on the basis of the plurality of contents include a display object in which output of each of the plurality of contents is switched.
(19) An information processing method to be performed by a processor, the information processing method including:
deciding a form of each of a plurality of display objects based on a plurality of contents, on the basis of viewing priority information which has an influence on viewing priority of the content corresponding to the display object; and
causing an output unit to output each of the plurality of display objects in the decided form.
(20) A program for causing a computer to execute:
a decision function of deciding a form of each of a plurality of display objects based on a plurality of contents, on the basis of viewing priority information which has an influence on viewing priority of the content corresponding to the display object; and
an output control function of causing an output unit to output each of the plurality of display objects in the form decided by the decision function.

What is claimed is:
1. An information processing apparatus comprising:
circuitry configured to
decide a form of each of a plurality of display objects based on a plurality of contents on the basis of viewing priority information which has an influence on viewing priority of the content corresponding to the display object, wherein the viewing priority information indicates whether the content was generated according to at least one of a first mode of operation of a device capturing the content and second mode of operation of a device capturing the content; and
control a user interface to output each of the plurality of display objects in a first form when the viewing priority information indicates that the content was generated according to the first mode of operation and a second form, which is different from the first form, when the viewing priority information indicates that the content was generated according to the second mode of operation.
2. The information processing apparatus according to claim 1, wherein
the form includes a size, shape, or brightness of the display object.
3. The information processing apparatus according to claim 1, wherein
the form includes a form of a sound associated with the display object.
4. The information processing apparatus according to claim 1, wherein
the circuitry is configured to control the user interface to scroll the display objects, and
the display objects are arranged in a scroll direction according to attribute information of the contents corresponding to the display objects.

5. An information processing apparatus comprising:
circuitry configured to
decide a form of each of a plurality of display objects based on a plurality of contents on the basis of viewing priority information which has an influence on viewing priority of the content corresponding to the display object;
control a user interface to output each of the plurality of display objects in decided form;
control the user interface to scroll the display objects, wherein
the display objects are arranged in a scroll direction according to attribute information of the contents corresponding to the display objects, and
in a case where a difference in location information of the contents corresponding to the display objects that are adjacent to each other is a predetermined range or more, the circuitry controls the user interface to display the location information of the content corresponding to the display object which is to be output later.

6. The information processing apparatus according to claim 5, wherein
when the location information of the contents corresponding to the display objects is displayed, the circuitry is configured to control the user interface to change a form of the display object which is to be output later into a form different from the decided form.

7. The information processing apparatus according to claim 4, wherein
the circuitry is configured to change a display range of a video of the display object according to scrolling of the display object.

8. The information processing apparatus according to claim 1, wherein
the viewing priority information includes at least one of information identifying a type of a device which has generated the content, quality information of the content, and information indicating a detail of the content.

9. The information processing apparatus according to claim 8, wherein
the quality information of the content includes information from which a degree of disturbance of the content is grasped.

10. The information processing apparatus according to claim 9, wherein
the disturbance of the content includes blurring of a video, defocus of a video, or darkness of a video.

11. The information processing apparatus according to claim 8, wherein
the detail of the content includes a form of an object appearing in a video or a composition of the video.

12. The information processing apparatus according to claim 1, wherein
the display object is generated on the basis of the plurality of contents.

13. The information processing apparatus according to claim 12, wherein
the plurality of contents include similar contents.

14. The information processing apparatus according to claim 12, wherein
the display object generated on the basis of the plurality of contents include a display object in which output of each of the plurality of contents is switched.

15. An information processing method to be performed by a processor, the information processing method comprising:
deciding a form of each of a plurality of display objects based on a plurality of contents on the basis of viewing priority information which has an influence on viewing priority of the content corresponding to the display object, wherein the viewing priority information indicates whether the content was generated according to at least one of a first mode of operation of a device capturing the content and second mode of operation of a device capturing the content; and
controlling a user interface to output each of the plurality of display objects in a first form when the viewing priority information indicates that the content was generated according to the first mode of operation and a second form, which is different from the first form, when the viewing priority information indicates that the content was generated according to the second mode of operation.

16. A non-transitory computer-readable medium including a program, which when executed by an electronic device, causes the electronic device to execute:
deciding a form of each of a plurality of display objects based on a plurality of contents on the basis of viewing priority information which has an influence on viewing priority of the content corresponding to the display object, wherein the viewing priority information indicates whether the content was generated according to at least one of a first mode of operation of a device capturing the content and second mode of operation of a device capturing the content; and
controlling a user interface to output each of the plurality of display objects in a first form when the viewing priority information indicates that the content was generated according to the first mode of operation and a second form, which is different from the first form, when the viewing priority information indicates that the content was generated according to the second mode of operation.

17. The information processing apparatus according to claim 1, wherein
the first mode of operation is an automatic generation mode in which the content is automatically captured by the device, and
the second mode of operation is a manual generation mode in which the content is generated according to a user's command to generate the content.

18. The information processing apparatus according to claim 17, wherein
the circuitry is configured to control the user interface to output each of the plurality of display objects in a first shape when the viewing priority information indicates that the content was generated according to the automatic generation mode and a second shape, which is different from the first shape, when the viewing priority information indicates that the content was generated according to the manual generation mode.

19. The information processing apparatus according to claim 17, wherein
the circuitry is configured to control the user interface to output each of the plurality of display objects in a brightness level when the viewing priority information indicates that the content was generated according to the automatic generation mode and a second brightness level, which is different from the first brightness level, when the viewing priority information indicates that the content was generated according to the manual generation mode.

20. An information processing method to be performed by a processor, the information processing method comprising:

deciding a form of each of a plurality of display objects based on a plurality of contents on the basis of viewing priority information which has an influence on viewing priority of the content corresponding to the display object;

controlling a user interface to output each of the plurality of display objects in decided form; and controlling the user interface to scroll the display objects, wherein the display objects are arranged in a scroll direction according to attribute information of the contents corresponding to the display objects, and in a case where a difference in location information of the contents corresponding to the display objects that are adjacent to each other is a predetermined range or more, controlling the user interface to display the location information of the content corresponding to the display object which is to be output later.

21. A non-transitory computer-readable medium including a program, which when executed by an electronic device, causes the electronic device to:

decide a form of each of a plurality of display objects based on a plurality of contents on the basis of viewing priority information which has an influence on viewing priority of the content corresponding to the display object;

control a user interface to output each of the plurality of display objects in decided form; and control the user interface to scroll the display objects, wherein the display objects are arranged in a scroll direction according to attribute information of the contents corresponding to the display objects, and in a case where a difference in location information of the contents corresponding to the display objects that are adjacent to each other is a predetermined range or more, control the user interface to display the location information of the content corresponding to the display object which is to be output later.

* * * * *